US009448318B2

(12) United States Patent
Martinez

(10) Patent No.: US 9,448,318 B2
(45) Date of Patent: Sep. 20, 2016

(54) DETERMINATION OF PARTICLE DISPLACEMENT OR VELOCITY FROM PARTICLE ACCELERATION MEASUREMENTS

(75) Inventor: Ruben D. Martinez, Sugarland, TX (US)

(73) Assignee: PGS Geophysical AS, Oslo (NO)

( * ) Notice: Subject to any disclaimer, the term of this patent is extended or adjusted under 35 U.S.C. 154(b) by 761 days.

(21) Appl. No.: 13/409,035

(22) Filed: Feb. 29, 2012

(65) Prior Publication Data

US 2013/0226493 A1 Aug. 29, 2013

(51) Int. Cl.
*G01V 1/00* (2006.01)
*G01V 1/36* (2006.01)
*G01V 1/28* (2006.01)

(52) U.S. Cl.
CPC ............... *G01V 1/364* (2013.01); *G01V 1/28* (2013.01); *G01V 2210/32* (2013.01); *G01V 2210/324* (2013.01); *G01V 2210/56* (2013.01)

(58) Field of Classification Search
CPC .................. G01V 1/364; G01V 2210/324
USPC ................ 702/16, 94, 96; 367/13, 38, 46
See application file for complete search history.

(56) References Cited

U.S. PATENT DOCUMENTS

| 5,051,963 | A * | 9/1991 | Linville et al. ............... 367/46 |
| 7,254,171 | B2 * | 8/2007 | Hudson .......................... 375/229 |
| 7,778,110 | B2 * | 8/2010 | Martin et al. ................... 367/38 |
| 8,077,541 | B2 * | 12/2011 | Ronnow ........................ 367/13 |
| 2012/0051179 | A1 * | 3/2012 | Shin .............................. 367/50 |
| 2012/0082001 | A1 * | 4/2012 | Welker et al. ................. 367/24 |
| 2012/0116682 | A1 * | 5/2012 | Saenger ........................ 702/16 |

OTHER PUBLICATIONS

Gross, Buhmann, Ziegler, Vogeli, Gotting, Sigg, Keuchel, "Visual Computing Linear Filtering, Edge Detection, Wiener Filter," 2006, Swiss Federal Institute of Technology Zurich, pp. 1-8.*
Vaseghi, "Advanced Digital Signal Processing and Noise Reduction," 2000, John Wiley & Sons Ltd, Second Edition, pp. 178-204.*
Adler, "Matrix and Fourier transform formulations," 2007, Carleton Univerity, pp. 1-6.*
James Wren, "Converting Acceleration, Velocity & Displacement," Dec. 16, 2010, Prosig The Noise & Vibration Blog, pp. 1-9.*
L. Perret et al., "3 Component Acceleration Field Measurement by Dual-time Stereoscopic Particle Image Velocimetry", dated 2006, 1 page.

(Continued)

*Primary Examiner* — Mischita Henson
*Assistant Examiner* — Christine Liao

(57) ABSTRACT

Techniques are described for determining particle displacement or particle velocity data from particle acceleration measurements. In an embodiment, an apparatus comprises an interface configured to received particle acceleration data, one or more processors, and one or more storage media. The one or more storage media store instructions for determining one or more of particle velocity data or particle displacement data, based upon the particle acceleration data, by processing the particle acceleration data using a filter that at least approximates a Wiener filter and that uses one or more damping factors selected to provide stability in the presence of noise in the particle acceleration data.

26 Claims, 17 Drawing Sheets

(56) References Cited

OTHER PUBLICATIONS

J. Yang et al., A Simple Approach of Integration of Acceleration Data of Dynamic Soil-Structure Interaction Analysis, Dated Aug. 2006, 1 page.

Mercer, Colin, "Acceleration, Velocity and Displacement Spectra-Omega", Dated Nov. 2006, 8 pages.

Adrain, Lincoln, "Calculating Velocity or Displacement From Acceleration Time Histories", PROSIG, Prosig Application Notes—Examples of Prosig Systems in Action, 6 pages, dated Oct. 5, 2007.

Wren, James, Converting Acceleration, Velocity & Displacement, http://blog.prosig.com/2010/12/16.methods-of-conversion-between-acceleration-velocity-and-displacement/, dated Dec. 16, 2010, 9 pages.

Mercer Colin Dr., "Differentiating and Integrating Signals Numerically", http://blog.prosig.com/2001/06/06/differentaiting-and-integrating-signals-numerically/, dated Jun. 6, 2011, 5 pages.

Coelho B. et al., "Enhancement of Double Integration Procedure Through Spectral Subtraction", Dated Dec. 10, 2010, 7 pages.

Stiros, Stathis, "Errors in Velocites and Displacements Deduced From Accelerographs: An Approach Based on the Theory of Error Propagation", dated May 2008, 1 page.

Hows, M.S., "Field Data Comparison of MEMS Accelerometers and Analog Geophones", Special Section: Seismic Acquisition, dated Jul. 2008, 6 pages.

Subia S.R. et al., "Nonlinear Hysteresis Curve Derived by Direct Numerical Investigation of Acceleration", Soll Dynamics and Earthquake Engineering, vol. 14, Issue 5, dated 1995, 1 page.

\* cited by examiner

FIG. 11

| Input \ Output | Acceleration | Velocity | Displacement |
|---|---|---|---|
| Acceleration |  | $\left[\dfrac{-i\omega}{\omega^2+\varepsilon}\right]$ | $\left[\dfrac{-i\omega}{\omega^2+\varepsilon}\right]^2$ |
| Velocity | $i\omega$ |  | $\left[\dfrac{-i\omega}{\omega^2+\varepsilon}\right]$ |
| Displacement | $-\omega^2$ | $i\omega$ |  |

DETERMINATION OF PARTICLE DISPLACEMENT OR VELOCITY FROM PARTICLE ACCELERATION MEASUREMENTS

BACKGROUND

In the oil and gas industry, geophysical prospecting is commonly used to aid in the search for and evaluation of subterranean formations. Geophysical prospecting techniques yield knowledge of the subsurface structure of the earth, which is useful for finding and extracting valuable mineral resources, particularly hydrocarbon deposits such as oil and natural gas. One technique associated with geophysical prospecting is a seismic survey. In a land-based seismic survey, a seismic signal is generated on or near the earth's surface and then travels downward into the subsurface of the earth. In a marine seismic survey, the seismic signal may also travel downward through a body of water overlying the surface of the earth. Seismic energy sources are used to generate the seismic signal which, after propagating into the earth, is at least partially reflected by subsurface seismic reflectors. Such seismic reflectors typically are interfaces between subterranean formations having different elastic properties, such as sound wave velocity and rock density, which lead to differences in acoustic impedance at the interfaces. The reflected seismic energy is detected and recorded by seismic sensors (also called seismic receivers) at or near the surface of the earth, in an overlying body of water, or at known depths in boreholes.

Example seismic sources for generating the seismic signal in land seismic surveys include, without limitation, explosives, vibrators, or other devices capable of generating seismic waves. Marine seismic surveys typically employ a submerged seismic source towed by a ship and periodically activated to generate an acoustic wavefield. The seismic source generating the wavefield may be of several types including, without limitation, a small explosive charge, an electric spark or arc, a marine vibrator or a gun. The seismic source gun may be a water gun, a vapor gun or an air gun. In many cases, the seismic source consists not of a single source element, but of a spatially-distributed array of source elements.

The appropriate types of seismic sensors are also diverse and may depend on the application. Example seismic sensors include, without limitation, particle velocity sensors, particularly in land surveys, and water pressure sensors, particularly in marine surveys. Seismic sensors may be deployed by themselves, but are more commonly deployed in sensor arrays. Additionally, different types of sensors, such as pressure sensors and particle acceleration sensors, may be deployed together in a seismic survey, collocated in pairs or pairs of arrays.

The resulting seismic data obtained in performing the survey is processed to yield information relating to the geologic structure and properties of the subterranean formations in the area being surveyed. For example, the processed seismic data may be processed for display and analysis of potential hydrocarbon content of these subterranean formations. The goal of seismic data processing is to extract from the seismic data as much information as possible regarding the subterranean formations in order to adequately image or otherwise characterize the geologic subsurface. Accurate characterizations of the geologic subsurface may greatly facilitate geophysical prospecting for petroleum accumulations or other mineral deposits.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 11 is a table that summarizes the use of filters for the calculation of one measurement from another measurement;

DETAILED DESCRIPTION

Figure 1:
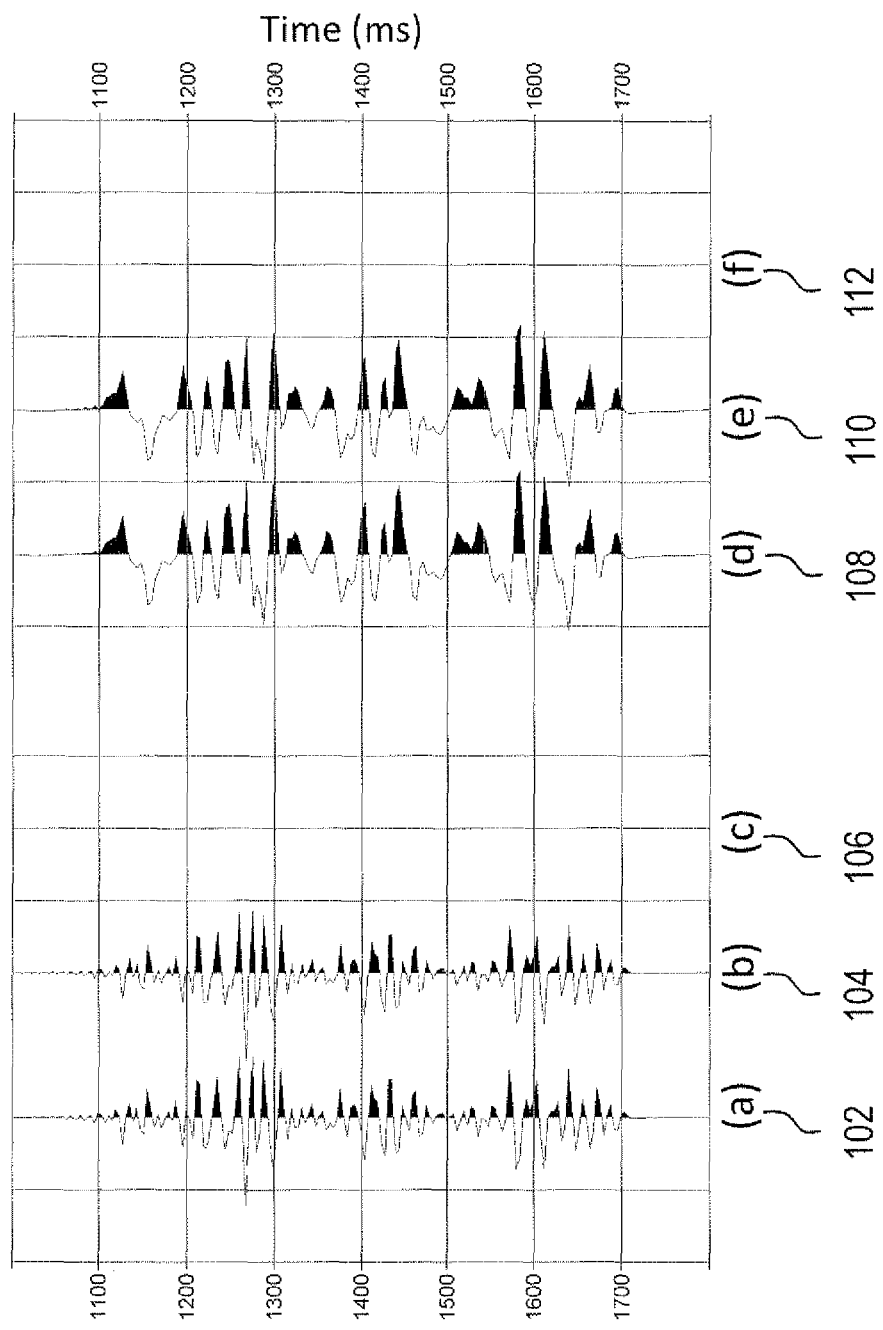
FIG. 1 is a graph illustrating example results of calculating particle displacement data from noise-free particle acceleration data.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
II. ACCELERATION MEASUREMENTS AND THE EFFECTS OF NOISE
III. CALCULATION OF PARTICLE DISPLACEMENT OR PARTICLE VELOCITY IN THE PRESENCE OF NOISE
IV. FILTER OPTIMIZATION FOR STABLE CALCULATIONS
V. IMPLEMENTATION EXAMPLES
VI. EXTENSIONS AND ALTERNATIVES

I. Overview

Techniques are described for determining particle displacement or particle velocity data from particle acceleration measurements. In an embodiment, an apparatus is configured to receive particle acceleration data. The apparatus may further be configured to determine one or more of particle velocity data or particle displacement data, based upon the particle acceleration data, by processing the particle acceleration data using a filter that at least approximates a Wiener filter and that uses one or more damping factors selected to provide stability in the presence of noise in the particle acceleration data.

In an embodiment, the apparatus is configured to automatically determine a damping factor based on the received particle acceleration data. To determine the damping factor, the apparatus may be configured to determine calculated acceleration data based on the particle velocity or particle displacement data and determine whether a threshold is satisfied by comparing the calculated acceleration data with the particle acceleration data. In response to determining that the threshold is not satisfied, the apparatus adjusts the damping factor. In response to determining that the threshold is satisfied, the apparatus determines that the damping factor is a satisfactory damping factor. When comparing the calculated acceleration data with the particle acceleration data, the apparatus may be configured to determine a first energy value from the calculated acceleration data, determine a second energy value from the particle acceleration data, and determine a difference between the first energy value and the second energy value. The apparatus may determine that the threshold is satisfied if the difference between the first energy value and the second energy value is less than a threshold. In another embodiment, the apparatus may be configured to automatically determine the damping factor for each distinct set of acceleration data that is received.

In an embodiment, the apparatus may be configured to determine both the particle velocity data and the particle displacement data, based upon the particle acceleration data, by processing the particle acceleration data using the filter that at least approximates a Wiener filter and that uses one or more damping factors selected to provide stability in the presence of noise in the particle acceleration data. The apparatus may be configured to determine the particle velocity data by processing the particle acceleration data using the filter and a first damping factor and the particle displacement data by processing the particle acceleration data using the filter and a second damping factor. The first damping factor may be different than the second damping factor. Thus, different damping factors may be used to determine particle velocity data and particle displacement data.

In an embodiment, the Wiener filter is of a form represented by $$F(\omega) = \frac{-i\omega}{\omega^2 + \varepsilon},$$

wherein $F(\omega)$ represents the Wiener filter, i represents an imaginary number, $\omega$ represents an angular frequency, and $\varepsilon$ represents a damping factor.

In an embodiment, the apparatus may be configured to characterize subterranean geological features based on at least one of the particle velocity data or the particle displacement data.

II. Acceleration Measurements and the Effects of Noise

Recently, there has been increased interest in accelerometers for various applications such as seismic exploration and other industrial uses. In particular, micro-electro mechanical systems (MEMS) accelerometers have proved effective for efficiently recording particle acceleration, which is often helpful in determining the geologic structure and properties of the subterranean formations in an area being surveyed.

Acceleration measurements recorded by MEMS accelerometers typically have a flat amplitude response from very low to very high frequencies. Despite these positive characteristics, the calculation of particle displacement and velocity by integrating acceleration is not stable in the presence of noise. The instability manifests itself in the form of very high amplitude low frequency noise masking the displacement or velocity response after integration.

Equations (1) through (6), provided below, characterize the relationship between particle acceleration, particle displacement, and particle velocity. Reference is made to these equations to highlight the effects of noise on calculating particle velocity and displacement values from acceleration data.

The relationship between particle acceleration and particle displacement may be characterized as follows:

$$a(t) = \frac{d^2 u(t)}{dt^2} \qquad (1)$$

where $a(t)$ represents particle acceleration as a function of time (t), $u(t)$ represents particle displacement as a function of time (t), and $$\frac{d^2 u(t)}{dt^2}$$

represents the second derivative of $u(t)$ with respect to time (t).

The relationship between particle acceleration and particle velocity may be characterized as follows:

$$a(t) = \frac{dv(t)}{dt} \qquad (2)$$

where $a(t)$ represents particle acceleration as a function of time (t), $v(t)$ represents particle velocity as a function of time (t), and $$\frac{dv(t)}{dt}$$

represents the first derivative of v(t) with respect to time (t).

In the frequency domain, equation (1) may be expressed as:

$$A(\omega) = -\omega^2 U(\omega) \tag{3}$$

and equation (2) may be expressed as:

$$A(\omega) = i\omega V(\omega) \tag{4}$$

where $A(\omega)$, $U(\omega)$ and $V(\omega)$ represent particle acceleration, displacement, and velocity respectively in the angular frequency domain ($\omega$), and i is an imaginary unit that may be expressed as $i=\sqrt{-1}$.

When the recorded data are acceleration measurements, and particle displacement or velocity is to be calculated, the particle acceleration may be: 1) double integrated to obtain particle displacement; or 2) single integrated to obtain particle velocity. The frequency domain expressions in equations (3) and (4) may be inverted, as expressed in equations (5) and (6), to achieve double or single integration, respectively.

For particle displacement calculations, the double integration may be represented in the frequency domain as:

$$U(\omega) = \frac{1}{-\omega^2} A(\omega) \text{ for } \omega > 0 \tag{5}$$

For particle velocity, the single integration may be represented in the frequency domain as:

$$V(\omega) = \frac{1}{i\omega} A(\omega) \text{ for } \omega > 0 \tag{6}$$

Figure 2:
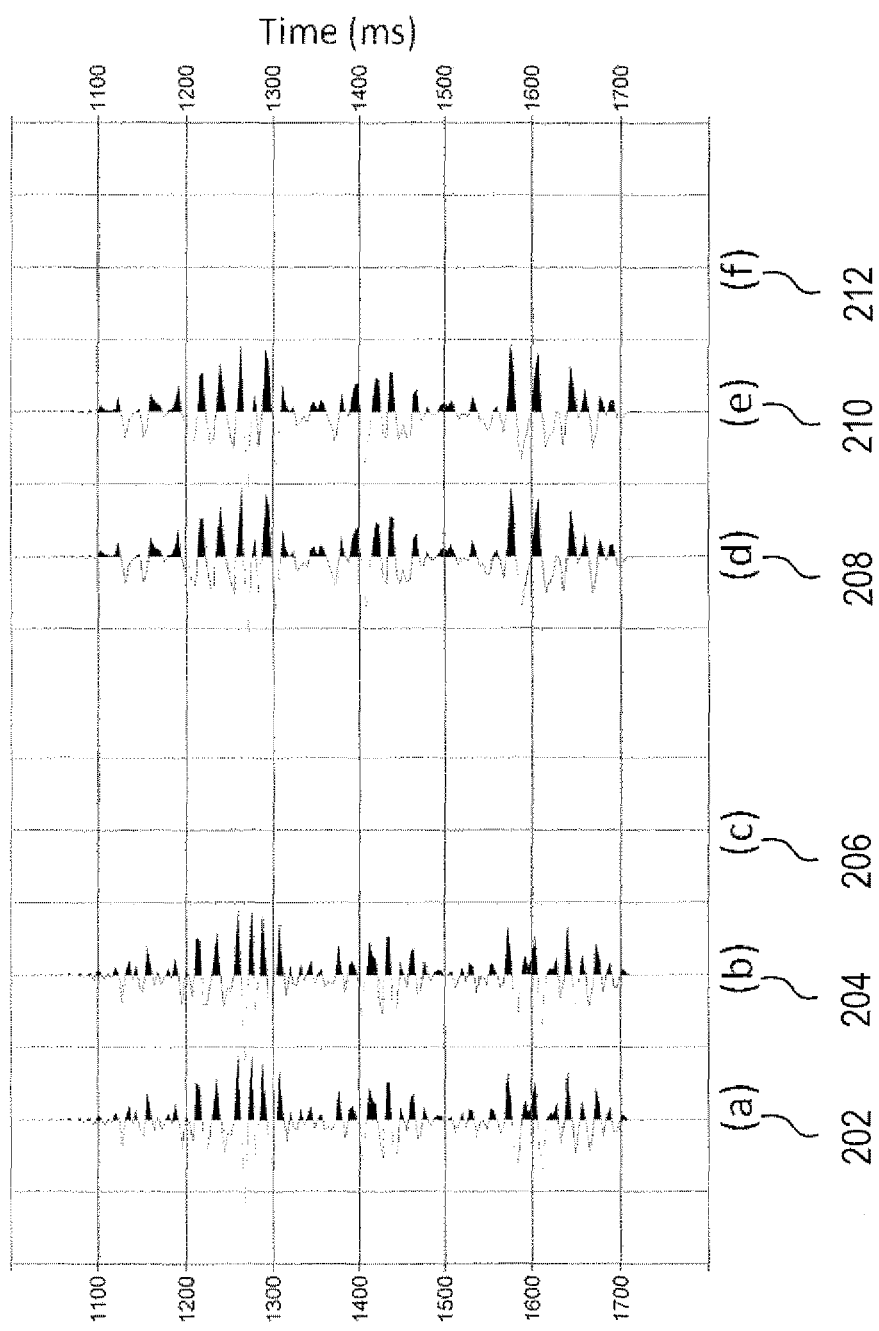
FIG. 2 is a graph illustrating example results of calculating particle velocity data from noise-free particle acceleration data.

Equations (5) and (6) are stable when the particle acceleration measurements are noise free, which is demonstrated in the synthetic data examples shown in FIGS. 1 and 2 for the estimation of particle displacement and velocity, respectively. However, when noise is added to the particle acceleration measurements, equations (5) and (6) become unstable, which is demonstrated in the synthetic data examples shown in FIGS. 3 and 4.

FIG. 1 is a graph illustrating example results of calculating particle displacement data from noise-free particle acceleration data. Referring to FIG. 1, trace (a) 102 shows synthetic ('observed') particle acceleration data. Trace (a) 102 and other traces labeled (a) referenced herein simulate acceleration data that may be recorded or otherwise measured by a MEMS or other accelerometer. Particle displacement is estimated by applying equation (5) to trace (a) 102. The results of this calculation are displayed in trace (e) 110. Trace (d) 108 shows the 'true' particle displacement data and trace (f) 112 is the difference between the calculated displacement data shown by trace (e) 110 and the 'true' particle displacement data shown by trace (d) 108. Because there is no noise in this simulated case, trace (f) 112 is very small. Trace (b) 104 shows the calculated particle acceleration data using the forward equation (3) on trace (e) 110. Trace (c) 106 shows the difference between the 'observed' and 'calculated' particle acceleration data, which is also very small.

This simulation demonstrates that in the absence of noise, equation (5) is very stable in calculating particle displacement.

FIG. 2 is a graph illustrating example results of calculating particle velocity from noise-free particle acceleration data. Referring to FIG. 2, trace (a) 202 shows synthetic ('observed') particle acceleration data. Particle velocity is estimated using this trace and equation (6). The results of this calculation are displayed in trace (e) 210. Trace (d) 208 shows the 'true' particle velocity data and trace (f) 212 is the difference between the calculated velocity data shown in trace (e) 210 and the 'true' particle velocity data shown in trace (d) 208. Because there is no noise in this simulated case, trace (f) 212 is very small. Trace (b) 204 shows the calculated particle acceleration data using the forward equation (4) on trace (e) 210. Trace (c) 206 shows the difference between the 'observed' and 'calculated' particle acceleration data, which is very small as well. This demonstrates that when there is no noise, equation (6) is very stable in calculating particle velocity.

Figure 3:
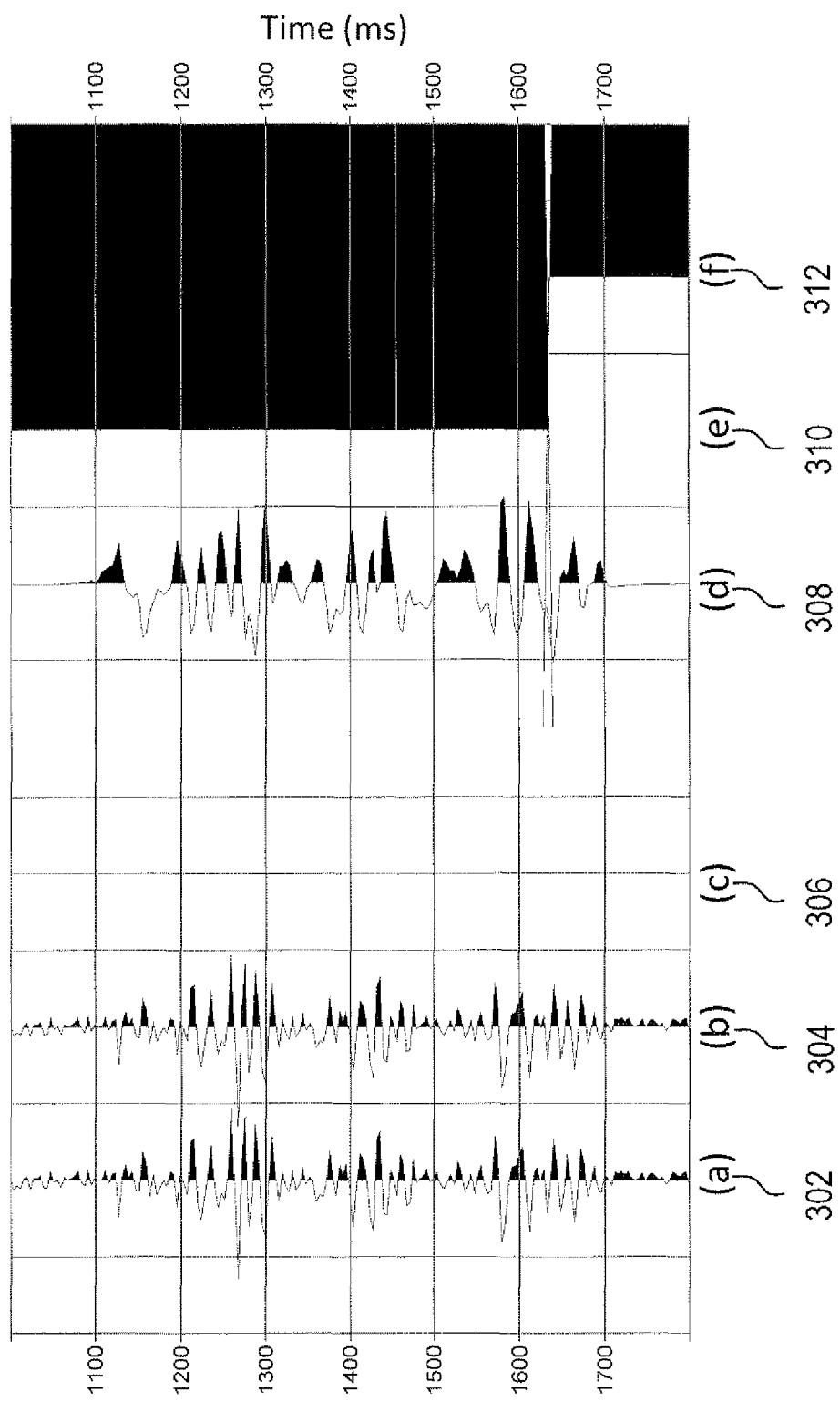
FIG. 3 is a graph illustrating an example of the effects of noise on calculation of particle displacement data from particle acceleration data.

FIG. 3 is a graph illustrating an example of the effects of noise on calculation of particle displacement data from particle acceleration data. Referring to FIG. 3, trace (a) 302 shows synthetic ('observed') particle acceleration data. Unlike trace (a) 102, trace (a) 302 includes noise that has been added to the acceleration data. Particle displacement is estimated using trace (a) 302 and equation (5). The results of this calculation are displayed in trace (e) 310. Trace (d) 308 shows the 'true' particle displacement data and trace (f) 312 is the difference between the calculated displacement data shown by trace (e) 310 and the 'true' particle displacement data shown by trace (d) 308. Because of the added noise in this simulated case, trace (f) 312 is very large. Trace (b) 304 shows the calculated particle acceleration data using the forward equation (3) on trace (e) 310. Trace (c) 306 shows the difference between the 'observed' and 'calculated' particle acceleration data, which is very small. This simulation demonstrates that in the presence of noise, equation (5) is unstable in calculating particle displacement.

Figure 4:
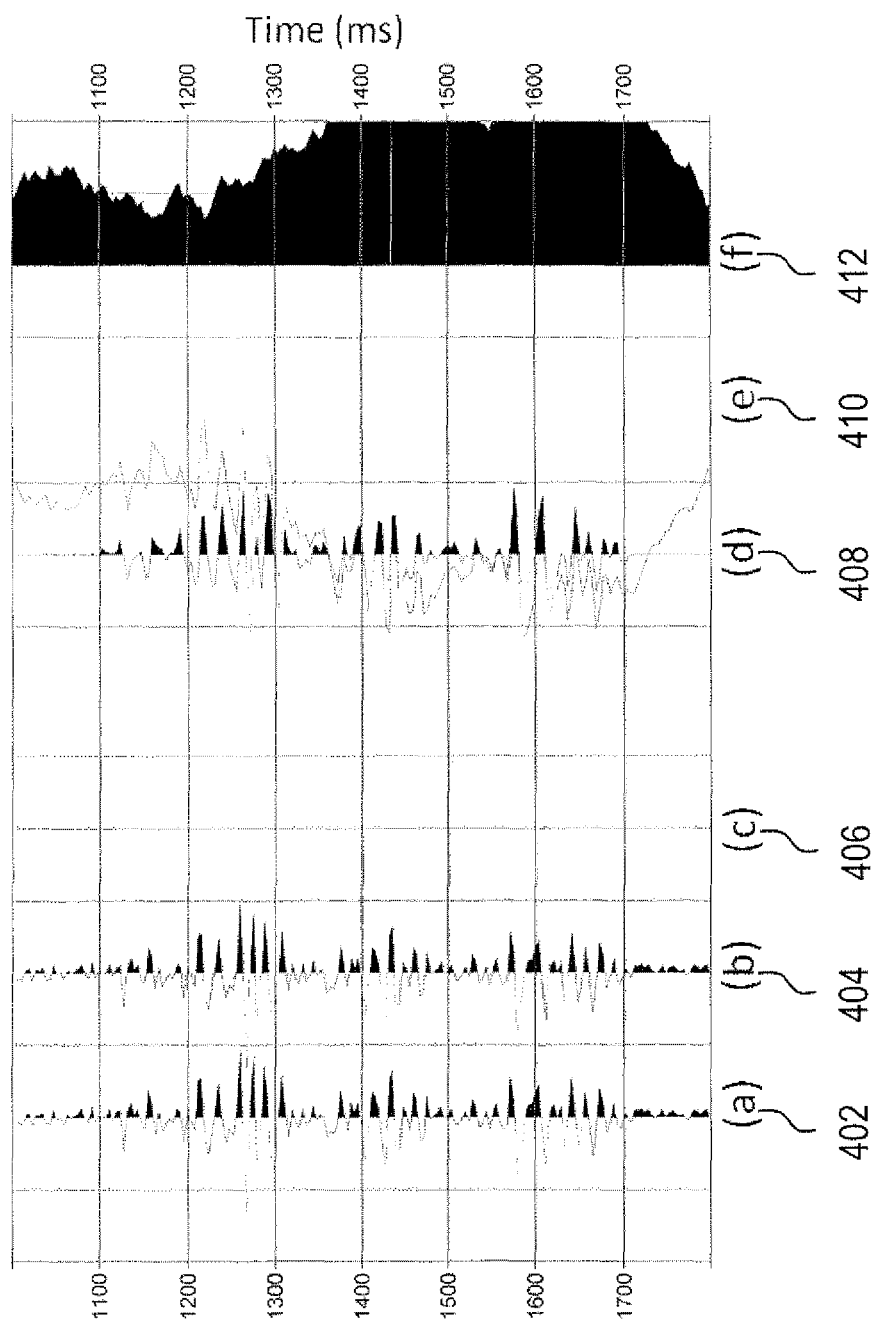
FIG. 4 is a graph illustrating an example of the effects of noise on calculation of particle velocity data from particle acceleration data.

FIG. 4 is a graph illustrating an example of the effects of noise on calculation of particle velocity data from particle acceleration data. Referring to FIG. 4, trace (a) 402 shows synthetic ('observed') particle acceleration data. Unlike trace (a) 202, trace (a) 402 includes noise that has been added to the acceleration data. Particle velocity is estimated using trace (a) 402 and equation (6). The results of this calculation are displayed in trace (e) 410. Trace (d) 408 shows the 'true' particle velocity data and trace (f) 412 is the difference between the calculated velocity data shown in trace (e) 410 and the 'true' particle velocity data shown in trace (d) 408. Because of the added noise in this simulated case, trace (f) 412 is very large. Trace (b) 404 shows the calculated particle acceleration data using the forward equation (4) on trace (e) 410. Trace (c) 406 shows the difference between the 'observed' and 'calculated' particle acceleration data, which is very small. This demonstrates that when there is no noise, equation (6) is very stable in calculating particle velocity.

As illustrated in FIGS. 3 and 4, a small amount of noise makes the integration process unstable. The calculated particle displacement data (trace (e) 310) and velocity (trace (e) 410) show high amplitude low frequency components created by noise. Trace (f) 312 and trace (f) 412 highlight the low frequencies built up by the integration performed with equations (5) and (6) when noise is present in the acceleration data.

Figure 5:
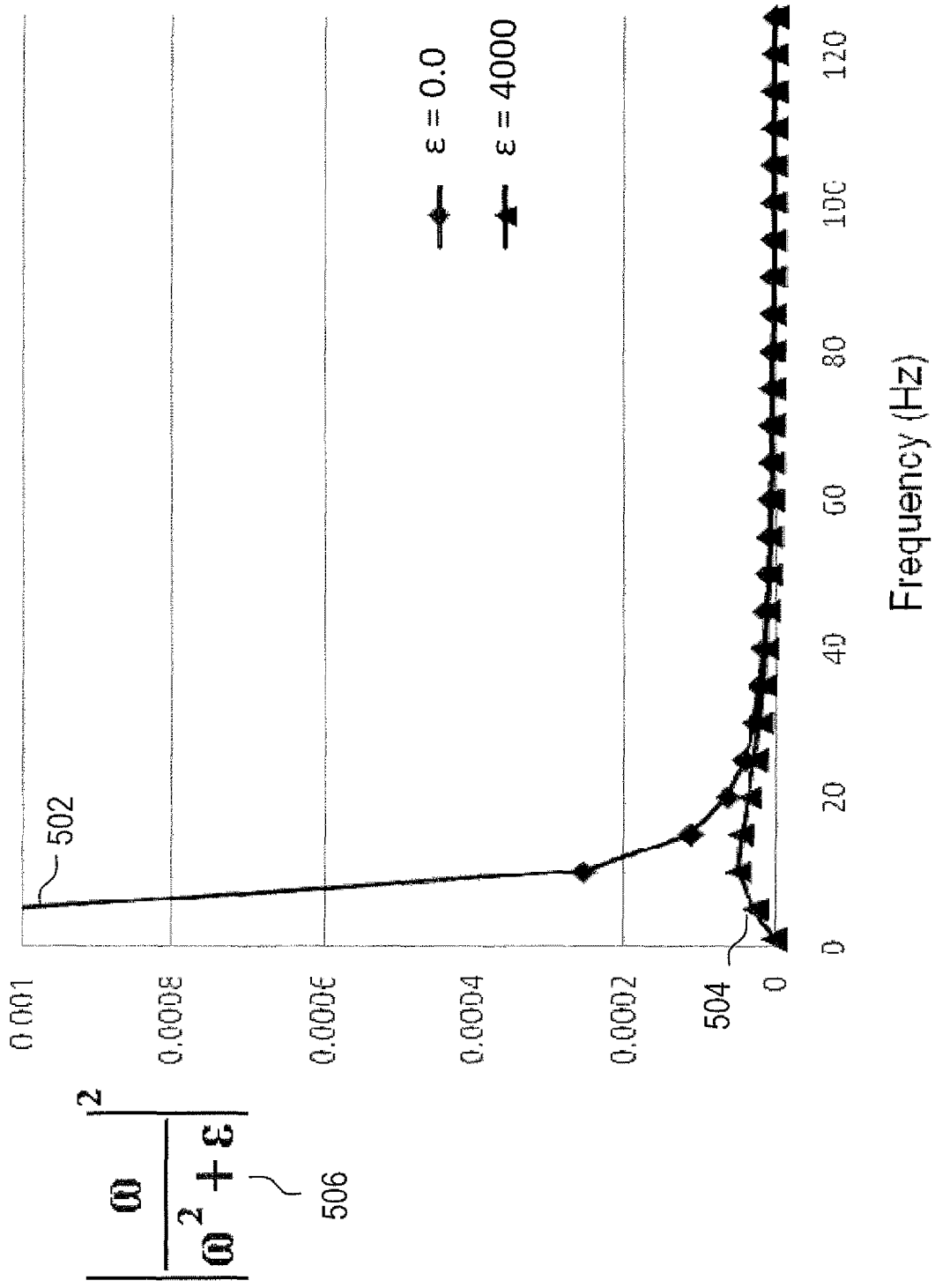
FIG. 5 is a graph of example amplitude responses of a double integration filter as applied to acceleration data with noise.

The origin of the instability can be explained by inspecting the amplitude response of the integration filters for the calculation of particle displacement $$\left[\frac{1}{-\omega^2}\right]$$

and velocity $$\left[\frac{1}{i\omega}\right]$$

used in equations (5) and (6) respectively. FIG. 5 illustrates example amplitude responses of a double integration filter. Referring to FIG. 5, amplitude response 502 corresponds to the amplitude response of squared Wiener filter 506 when the value of ϵ=0. The use of a squared Wiener filter for providing stability in the presence of noise is discussed in more detail below. In the present case, when ϵ=0, squared Wiener filter 506 is the same as the double integration filter of equation (5). As illustrated by amplitude response 502, as the frequency approaches zero a singularity amplifies the energy of the lower end of the frequency spectrum. When there is noise in the particle acceleration measurements, the amplification shown in amplitude response 502 is responsible for the abnormal low frequency noise boosting in displacement calculations.

Figure 6:
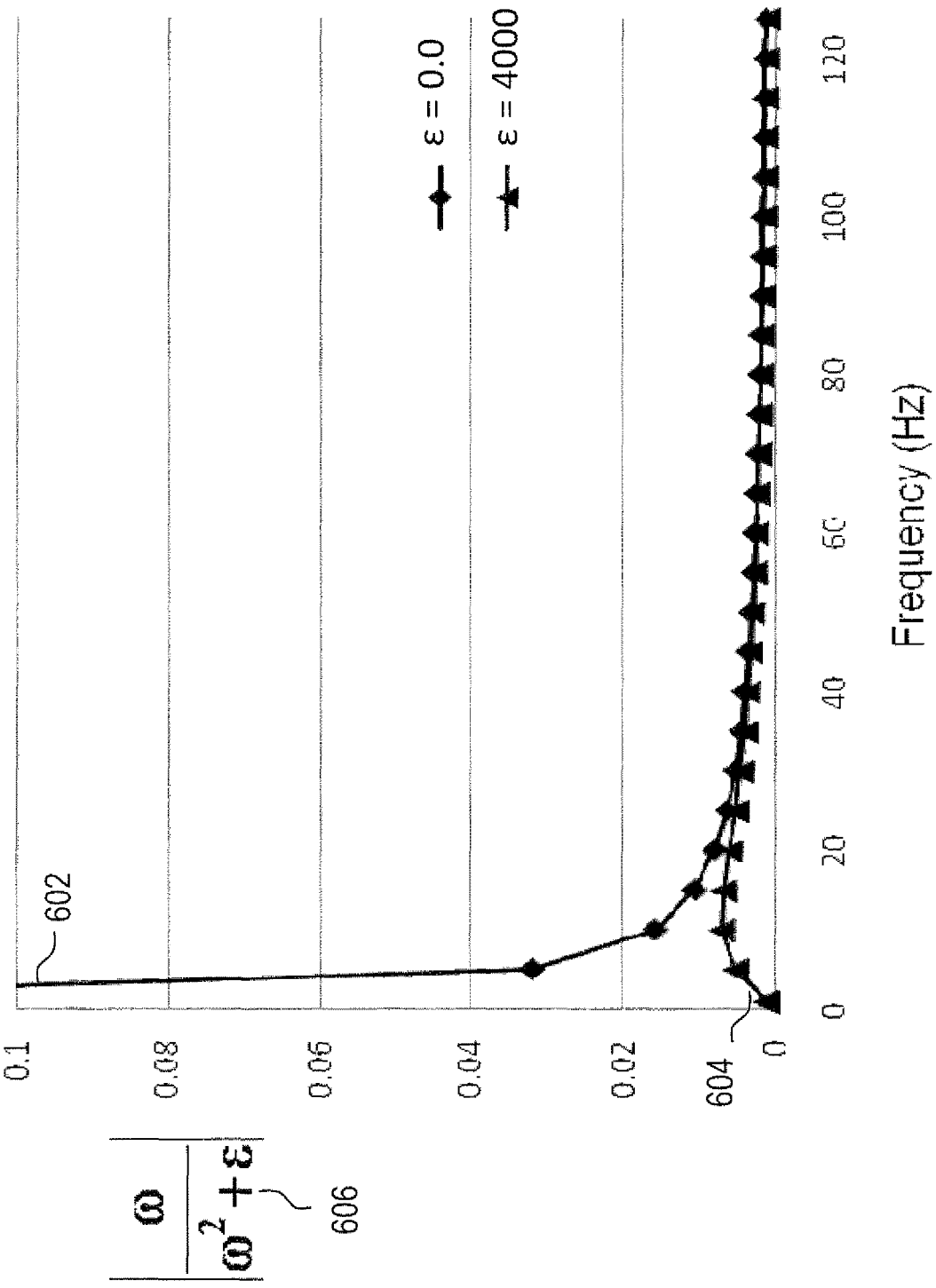
FIG. 6 is a graph of example amplitude responses of a single integration filter as applied to acceleration data with noise.

FIG. 6 illustrates example amplitude responses of a single integration filter. Referring to FIG. 6, amplitude response 602 corresponds to the amplitude response of Wiener filter 606 when the value of ϵ=0, resulting in the single integration filter of equation (6). As in the case of the amplitude response of the double integration filter, amplitude response 602 shows that as the frequency approaches zero, the energy of the lower end of the frequency spectrum is amplified. When there is noise in the particle acceleration measurements, the amplification shown in amplitude response 602 is responsible for the abnormal low frequency noise boosting in velocity calculations.

III. Calculation of Particle Displacement or Particle Velocity in the Presence of Noise In order to reduce the effects of noise highlighted above, a noise-reduction filter may be used to estimate particle displacement data and/or particle velocity data from the noisy acceleration data. In one embodiment, the respective integration filters $$\frac{1}{-\omega^2} \text{ and } \frac{1}{i\omega}$$

associated with equations (5) and (6), respectively, may be formulated as a deterministic Wiener filter. As illustrated below, a Wiener filter has good performance characteristics in the presence of noise and may achieve stability during the double and single integration of the particle acceleration data for the calculation of particle displacement and velocity. Further, the use of a filter that at least approximates a Wiener filter, as described below, avoids the need to apply filtering after integration and may operate in the presence of noise without estimating or knowing about the noise.

In an embodiment, a Wiener filter as used herein may refer to any deterministic filter that approximates a Wiener filter. Typically, a Wiener filter is stochastically derived. However, the Wiener filter described herein may also be deterministically derived such that it mathematically adopts the form of a statistical Wiener filter. For example, the filter may be derived by multiplying the integration filters $$\frac{1}{-\omega^2} \text{ and } \frac{1}{i\omega}$$

by their complex conjugates, which results in equations (7) and (8) below.

In an embodiment, the double integration filter in equation (5) is modified to the following form:

$$\frac{1}{-\omega^2} \approx \left[\frac{-i\omega}{\omega^2 + \epsilon}\right]^2 = F_u(\omega) \tag{7}$$

In another embodiment, the single integration filter in equation (6) is modified to the following form:

$$\frac{1}{i\omega} \approx \frac{-i\omega}{\omega^2 + \varepsilon} = F_v(\omega) \tag{8}$$

In the middle term of equations (7) and (8), E is a damping factor that is selected to provide stability to the double integration and single integration process in the presence of noise. The value of ϵ may be manually or automatically selected, depending on the implementation. Techniques for selecting a damping factor are described in further detail below.

In one embodiment, the value of ϵ may be any suitable constant to dampen undesirable amplification in the amplitude response of the integration filters. For example, the damping effects of ϵ are illustrated in FIGS. 5 and 6. Referring to FIG. 5, amplitude response 504 shows the amplitude response of Wiener filter 506 when a damping factor of 4000 is selected. Similarly, in FIG. 6, amplitude response 604 shows the amplitude response of Wiener filter 606 when a damping factor of 4000 is selected. In contrast to amplitude responses 502 and 602, amplitude response 504 and 604 are dampened at low frequencies.

Thus, the damping factor provides stability by not amplifying the low frequency end of the spectrum, thereby reducing the effects of noise, and if chosen properly, produces reliable particle displacement or particle velocity amplitudes and phases. The stability is demonstrated by applying the Wiener filters of equations (7) and (8) to the same noisy synthetic particle acceleration data set shown on trace (a) of either FIG. 3 or 4.

Figure 7:
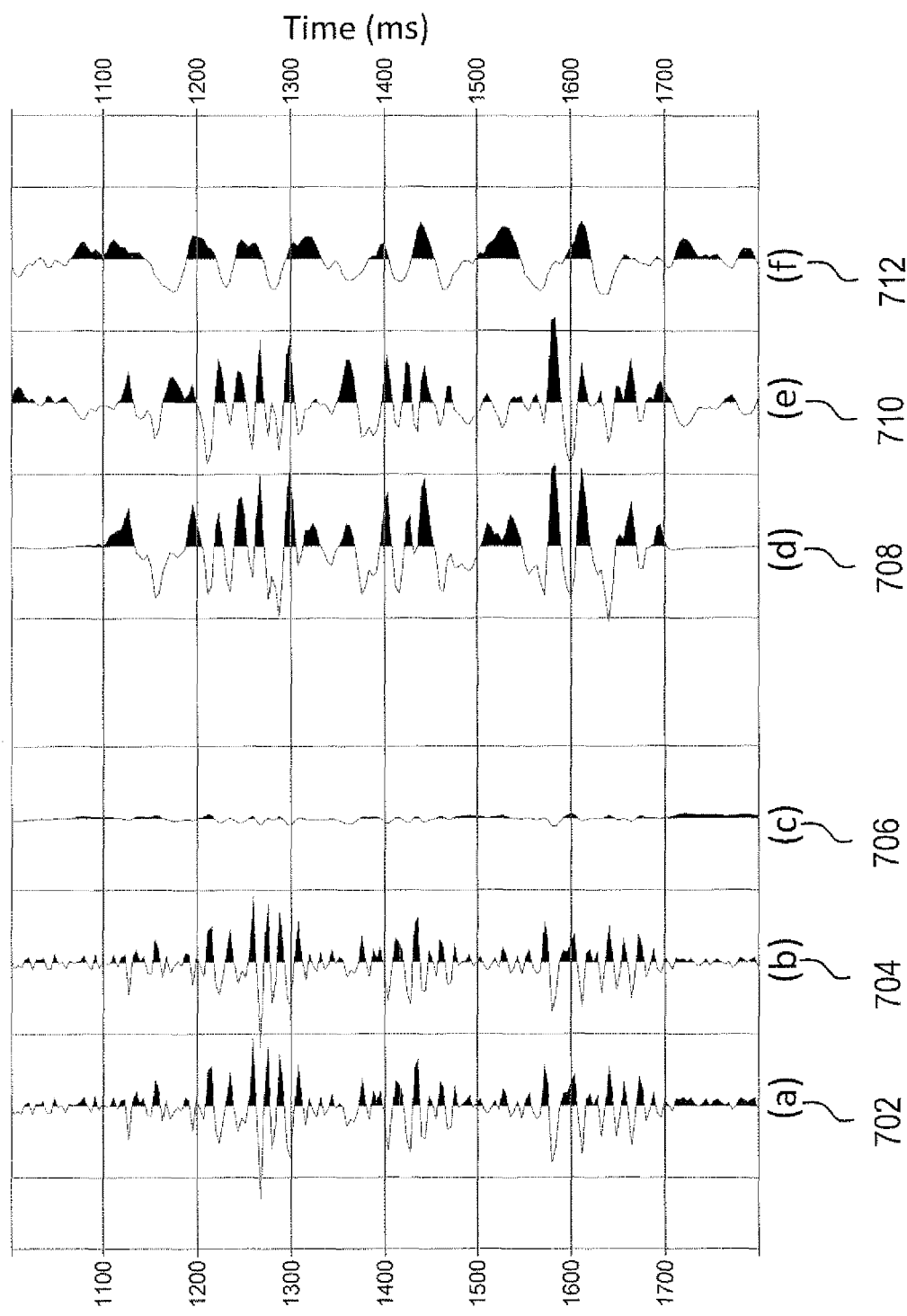
FIG. 7 is a graph illustrating an example calculation of particle displacement data from noisy acceleration data using a deterministic Wiener filter.

FIG. 7 is a graph illustrating an example calculation of particle displacement data from noisy acceleration data using a deterministic Wiener filter. Referring to FIG. 7, trace (a) 702 shows synthetic ('observed') particle acceleration data, which is the same 'observed' noisy particle acceleration data shown in trace (a) 302. Particle displacement is estimated using this trace and equation (7). The results of this calculation are displayed in trace (e) 710. Trace (d) 708 shows the 'true' particle displacement data, which is the same as trace (d) 308. Trace (f) 712 corresponds to the noise residuals obtained from the difference of the estimated particle displacement of trace (e) 710 and the 'true' particle displacement of trace (d) 708. Trace (b) 704 shows the calculated particle acceleration data using the forward equation (4) on trace (e) 710. Trace (c) 706 shows the difference between the 'observed' and 'calculated' particle acceleration data.

Figure 8:
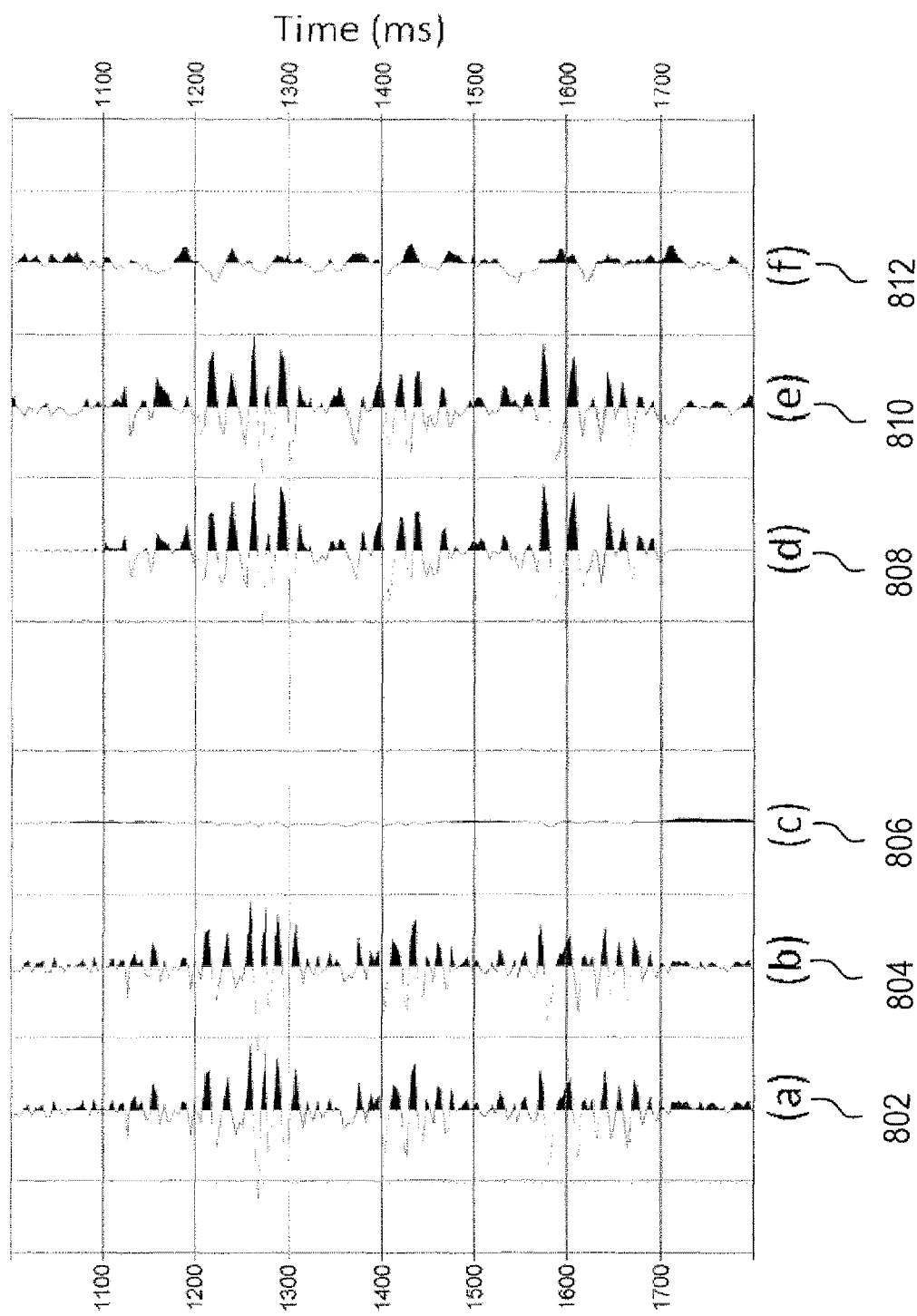
FIG. 8 is a graph illustrating an example calculation of particle velocity data form noisy acceleration data using a deterministic Wiener filter.

FIG. 8 is a graph illustrating an example calculation of particle velocity data form noisy acceleration data using a deterministic Wiener filter. Referring to FIG. 8, trace (a) 802 shows synthetic ('observed') particle acceleration data, which is the same 'observed' noisy particle acceleration data shown in trace (a) 402. Particle velocity is estimated using this trace and equation (8). The results of this calculation are displayed in trace (e) 810. Trace (d) 808 shows the 'true' particle velocity data, which is the same as trace (d) 408. Trace (f) 812 corresponds to the noise residuals obtained from the difference of the estimated particle velocity of trace (e) 810 and the 'true' particle velocity of trace (d) 808. Trace (b) 804 shows the calculated particle acceleration data using the forward equation (4) on trace (e) 810. Trace (c) 806 shows the difference between the 'observed' and 'calculated' particle acceleration data.

Trace (c) in the above figures corresponds to particle acceleration noise residuals for each case of displacement and velocity calculations. This trace may be used to determine the relevant measurement for goodness of fit between the calculated data and the observed data since particle acceleration is the input data. However, in the presence of noise, a perfect fit does not necessarily imply that the particle displacement or velocity estimates are stable and accurate, as demonstrated in the cases illustrated by FIGS. 3 and 4. Furthermore, the difference shown in trace (f) of the above figures is computed assuming the knowledge of the 'true' particle displacement or velocity, which in real data cases may be unknown or otherwise unavailable. Accordingly, the difference calculation (trace (f)) is included for purposes of illustrating the performance of the deterministic Wiener filters, but may be unavailable, depending on the particular implementation.

Figure 9:
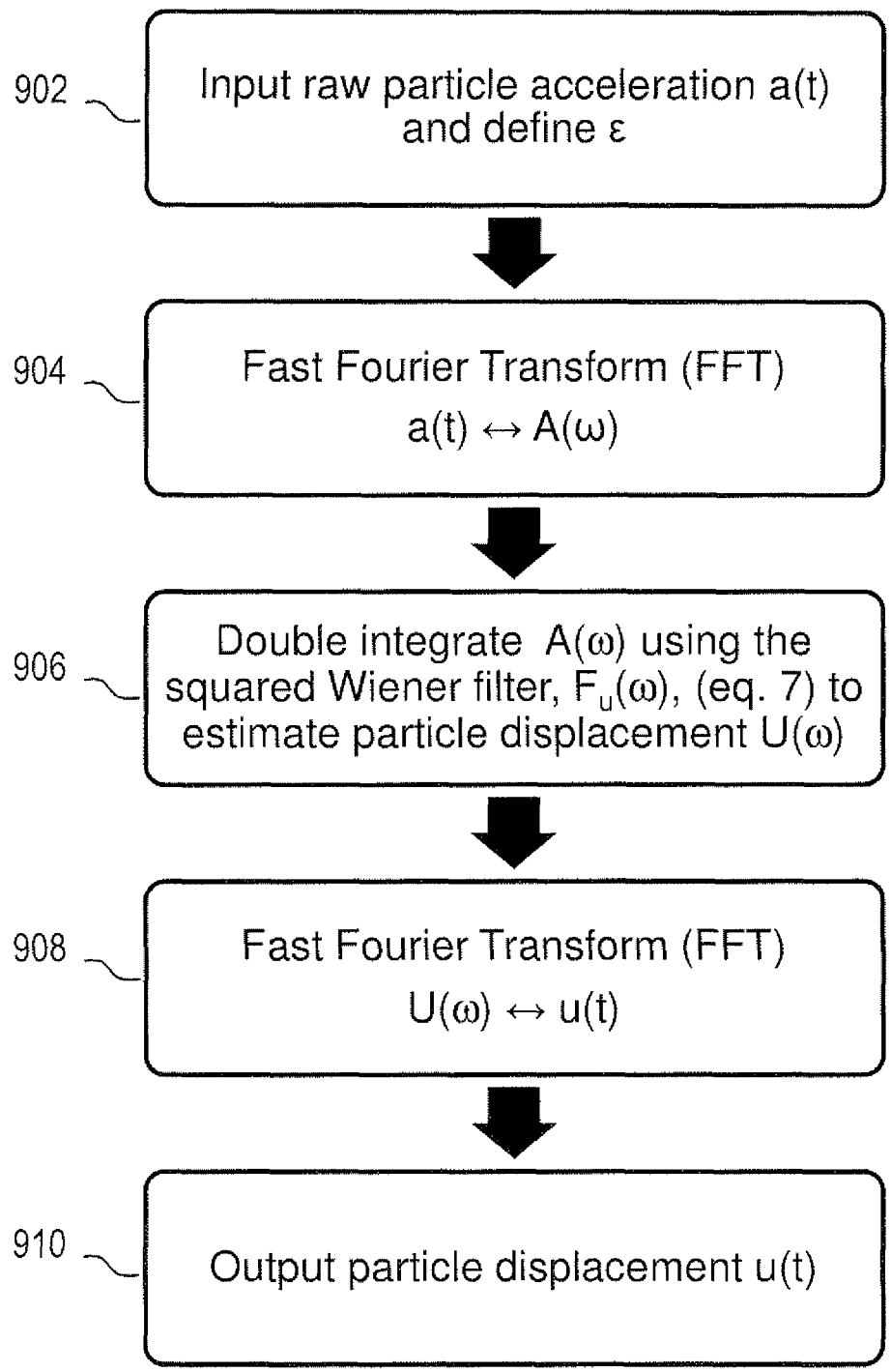
FIG. 9 is a flowchart illustrating a process for calculating particle displacement data from particle acceleration data using a deterministic Wiener filter.

FIG. 9 is a flowchart illustrating a process for calculating particle displacement data from particle acceleration data using a deterministic Wiener filter. In step 902, raw acceleration data is input and a damping factor is defined. This step may include, without limitation, recording or otherwise receiving an acceleration signal from a MEMS or other type of accelerometer that measures particle acceleration. The damping factor defined at this step may be manually or automatically selected, depending on the particular implementation. In an embodiment, a damping is selected to provide stability in the presence of noise in the particle acceleration data. The process illustrated in FIG. 13 may be used to select the damping factor.

In step 904, frequency domain acceleration data is determined from the received particle acceleration data. This step may include, without limitation, using a Fast Fourier Transform (FFT) to extract or otherwise estimate components of different frequencies that form the particle acceleration signal received by the accelerometer. For example, the FFT may be used to transform time-domain acceleration data of a form approximated by equation (1) to frequency-domain acceleration data of a form approximated by equation (3).

In step 906, a squared Wiener filter is used to estimate frequency-domain particle displacement data. In an embodiment, the Wiener filter $F_u(\omega)$ of equation (7) is applied to the frequency-domain acceleration data determined at step 904. Applying the Wiener filter may include, without limitation, performing a convolution operation on the frequency-domain acceleration data using the squared Wiener filter.

In step 908, time-domain particle displacement data is determined from the frequency-domain particle displacement data. This step may include, without limitation, using a Fast Fourier Transform (FFT) to estimate particle displacement as a function of time based on the component frequencies represented in the frequency-domain particle displacement data.

In step 910, the particle displacement data is output. Outputting the particle displacement data may include, without limitation, displaying, storing, or printing the particle displacement data, or sending the particle data to another device or application program. Furthermore, the particle displacement data that is output may be used to characterize subterranean geological features associated with the acceleration measurements. For example, the particle displacement data may be used in conjunction with other seismic data to estimate the properties of the Earth's subsurface from reflected seismic waves.

Figure 10:
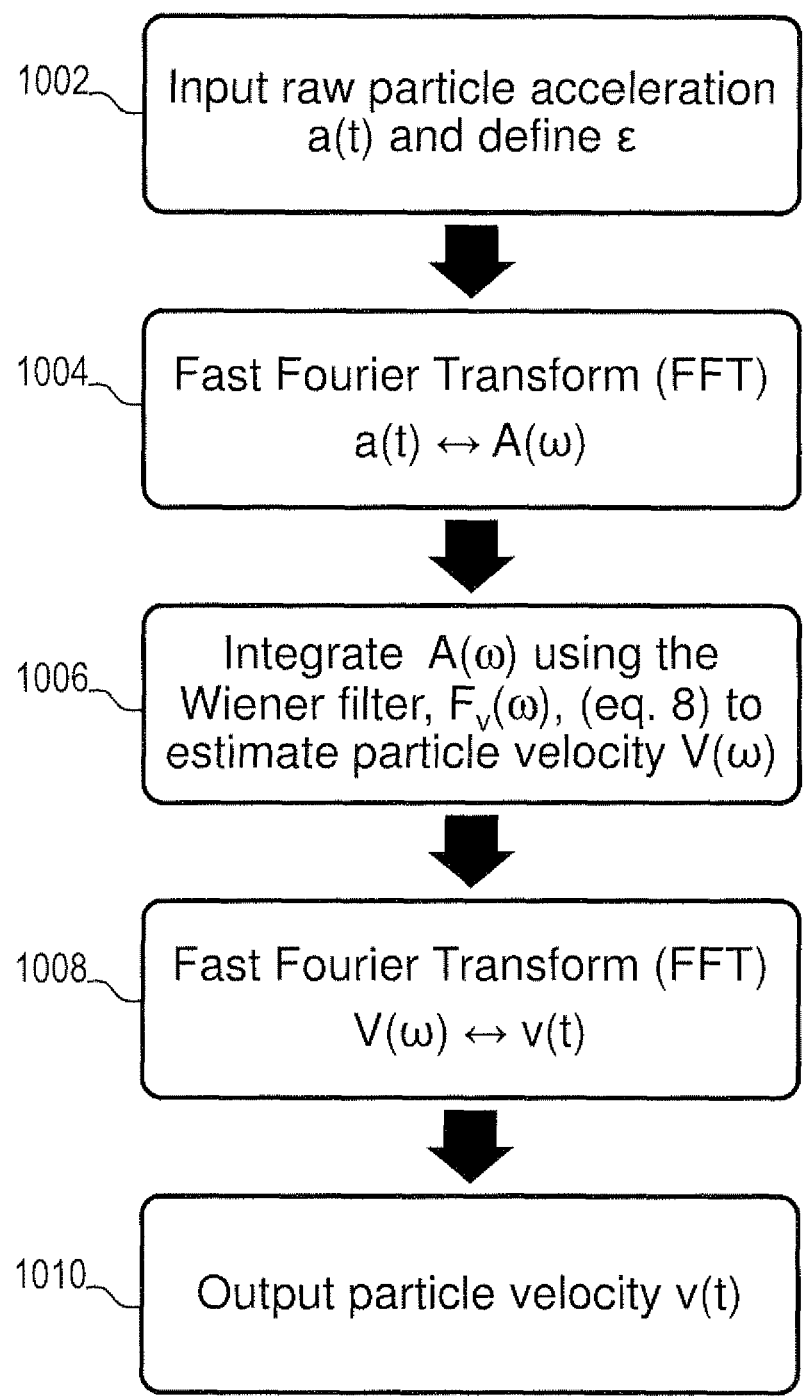
FIG. 10 is a flowchart illustrating a process for calculating particle velocity data from particle acceleration data using a deterministic Wiener filter.

FIG. 10 is a flowchart illustrating a process for calculating particle velocity data from particle acceleration data using a deterministic Wiener filter. In step 1002, raw acceleration data is input and a damping factor is defined. The same acceleration data set input at step 1002 may also be used in the process illustrated in FIG. 10. Alternatively, the process of FIG. 10 may be independent of the process illustrated in FIG. 9. The damping factor defined at this step may be manually or automatically selected, depending on the particular implementation. In an embodiment, a damping factor is selected to provide stability in the presence of noise in the particle acceleration data. The process illustrated in FIG. 14 may be used to select the damping factor.

In step 1004, frequency domain acceleration data is determined from the received particle acceleration data. This step may include without limitation using a Fast Fourier Transform (FFT) to extract or otherwise estimate components of different frequencies that form the particle acceleration signal. For example, the FFT may be used to transform time-domain acceleration data of a form approximated by equation (2) to frequency-domain acceleration data of a form approximated by equation (4).

In step 1006, a Wiener filter is used to estimate frequency-domain particle velocity data. In an embodiment, the Wiener filter $F_v(\omega)$ of equation (8) is applied to the frequency-domain acceleration data determined at step 1004. Applying the Wiener filter may include, without limitation, performing a convolution operation on the frequency-domain acceleration data using the Wiener filter.

In step 1008, time-domain particle velocity data is determined from the frequency-domain particle velocity data. This step may include, without limitation, using a Fast Fourier Transform (FFT) to estimate particle velocity as a function of time based on the component frequencies represented in the frequency-domain particle velocity data.

In step 1010, the particle velocity data is output. Outputting the particle velocity data may include, without limitation, displaying, storing, or printing the particle velocity data, or sending the particle data to another device or application program. Furthermore, the particle velocity data that is output may be used to characterize subterranean geological features associated with the acceleration measurements. For example, the particle velocity data may be used in conjunction with other seismic data to estimate the properties of the Earth's subsurface from reflected seismic waves.

The techniques described above highlight the use of a Wiener filter to provide stable calculations of particle velocity and particle displacement data from particle acceleration measurements. However, the techniques may also be used to provide stable calculations from different input sources. For example, if the input signal at step 902 is particle velocity data that is measured or otherwise observed, then the Wiener filter of equation (8) may be applied to the particle velocity data to estimate particle displacement.

FIG. 11 is a table that summarizes the filters described above for the calculation of one measurement (output) from another measurement (input). Referring to FIG. 11, if the input measurement is acceleration, then velocity may be calculated using the Wiener filter $$\frac{-i\omega}{\omega^2 + \varepsilon}$$

and displacement may be calculated using the squared Wiener filter $$\left[\frac{-i\omega}{\omega^2 + \varepsilon}\right]^2.$$

If the input measurement is velocity, then acceleration may be calculated using the first derivative filter $i\omega$ and displacement may be calculated using the Wiener filter $$\frac{-i\omega}{\omega^2 + \varepsilon}.$$

If the input measurement is displacement, then acceleration may be calculated using the second derivative filter $-\omega^2$ and velocity may be calculated using the first derivative filter $i\omega$.

IV. Filter Optimization for Stable Calculations

The choice of the damping factor may determine the effectiveness of the integration Wiener filters highlighted above. According to the techniques described herein, a damping factor may be determined based on a comparison between the observed acceleration data and calculated acceleration data. For example, the observed acceleration data illustrated in trace (a) 702 or trace (a) 802 may be compared to the calculated acceleration data illustrated in trace (b) 704 or trace (b) 804, respectively, to determine whether a threshold is satisfied. If the threshold is satisfied, then the damping factor may be selected as satisfactory. If the threshold is not satisfied, then a different damping factor may be selected.

Figure 12:
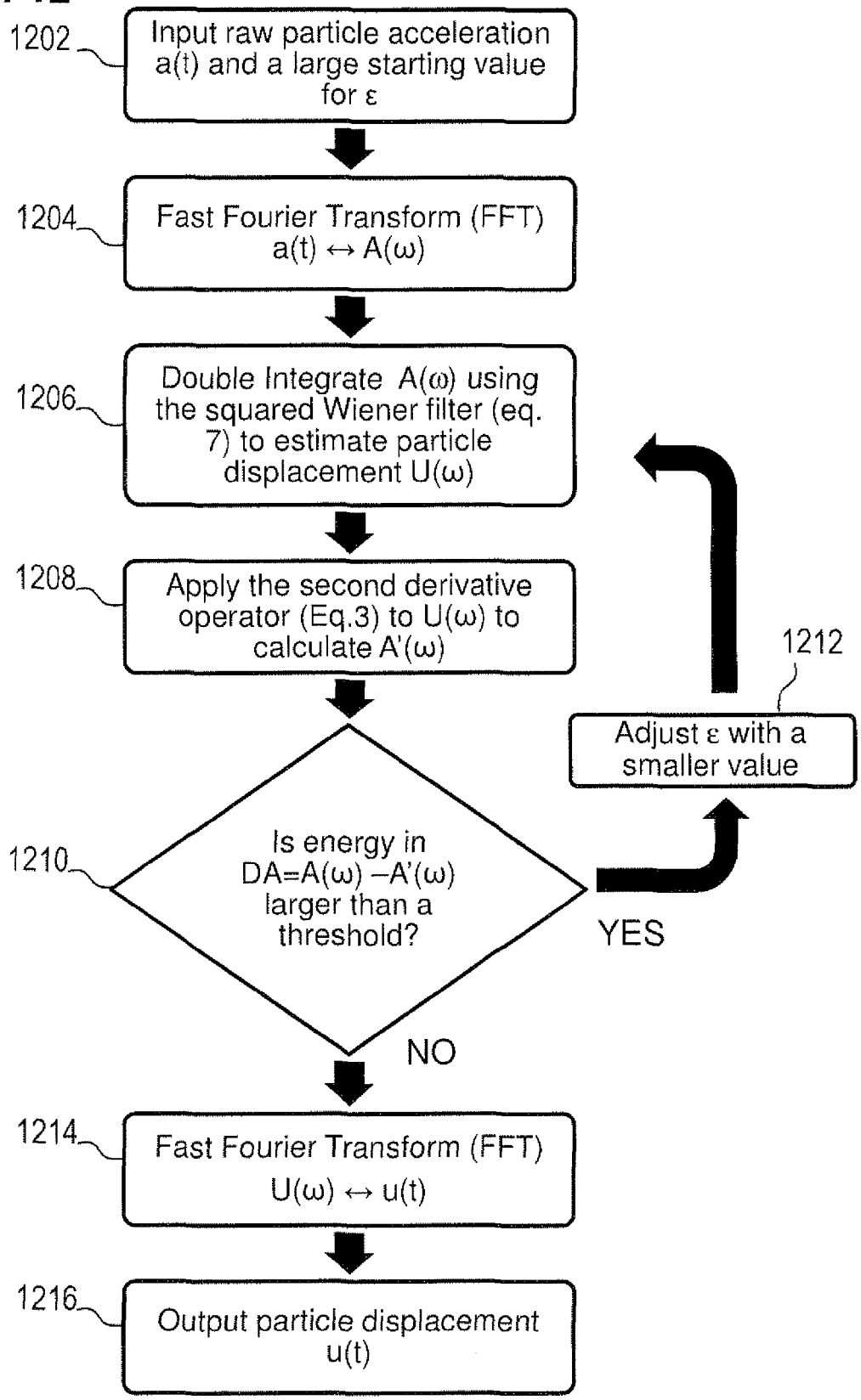
FIG. 12 is a flowchart illustrating a process for selecting a damping factor when estimating particle displacement.

FIG. 12 is a flowchart illustrating a process for selecting a damping factor when estimating particle displacement. In step 1202, raw acceleration data is input similar to step 902 above and a large starting value for $\epsilon$ is initially selected.

In step 1204, frequency-domain acceleration data is determined from the particle acceleration data received such as described in step 904 above.

In step 1206, a squared Wiener filter is used to estimate frequency-domain particle displacement data. In an embodiment, the Wiener filter $F_u(\omega)$ of equation (7) is applied to the frequency-domain acceleration data determined such as described in step 906 above.

In step 1208, frequency-domain acceleration data is calculated based on the frequency-domain particle displacement data. To calculate the acceleration data, this step may include performing a second derivative operation with respect to the frequency-domain particle displacement data. For example, the second derivative filter of equation (3), $-\omega^2$, may be applied to the frequency-domain particle displacement data.

In step 1210, the energy between of the observed and calculated particle acceleration data is estimated and compared to a supplied minimum threshold value. In an embodiment, the energy data may be calculated and compared based on the following formulas:

$$EA_{obs} = \frac{1}{Nnyq} \sum_{0}^{\omega nyq} A^2(\omega); \tag{9}$$

$$EA_{calc} = \frac{1}{Nnyq} \sum_{0}^{\omega nyq} A'^2(\omega); \tag{10}$$

and $$E_{rat} = 20\log_{10}\left(\frac{EA_{obs}}{EA_{calc}}\right); \tag{11}$$

where $\omega nyq$ represents the Nyquist angular frequency, $N_{nyq}$ represents the number of angular frequency samples in the spectrum up to the Nyquist frequency, $\Sigma$ represents a summation operator, $EA_{obs}$ represents the energy of the observed acceleration, $EA_{calc}$ represents the energy of the calculated acceleration, and $E_{rat}$ represents the residual energy. The residual energy may be compared to a supplied threshold value in decibels. If $E_{rat}$ is larger than the threshold then the damping factor may be adjusted. If $E_{rat}$ is smaller than the threshold, then the current value of the damping factor may be saved for subsequent processing.

When the threshold is not satisfied at step 1210, then in step 1212, the value of the damping factor is adjusted to a lower value. The lower value may be manually chosen or automatically selected based on any suitable criteria. Once the lower value is selected, the process repeats with step 1206, and the particle displacement data is recalculated using the squared Wiener filter modified with the new damping factor. The process repeats until a satisfactory damping factor is determined.

If the threshold is satisfied at step 1210, then the most recent damping factor may be selected as the damping factor and, at step 1214, time-domain particle displacement data is determined from the frequency-domain particle displacement data that was calculated at step 1206 with the damping factor. The time-domain particle displacement data may be calculated in the same manner described in step 908.

In step 1216, the particle displacement value is output such as described in step 910.

Figure 13:
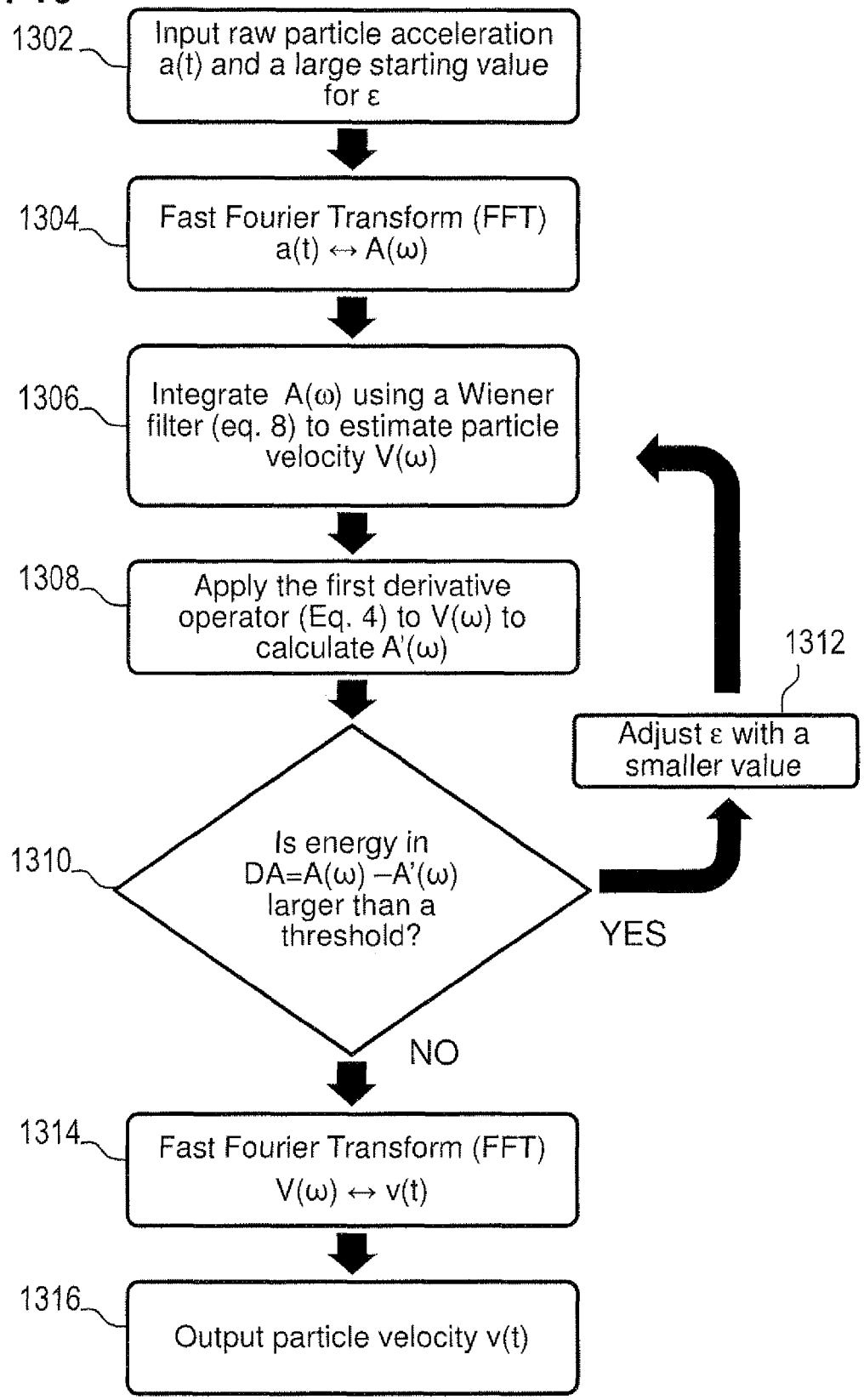
FIG. 13 is a flowchart illustrating a process for selecting a damping factor when estimating particle velocity.

FIG. 13 is a flowchart illustrating a process for estimating a damping factor when estimating particle velocity. In step 1302, raw acceleration data is input similar to step 1002 and a large starting value for $\epsilon$ is initially selected.

In step 1304, frequency-domain acceleration data is determined from the particle acceleration data received such as described in step 1004 above.

In step 1306, a Wiener filter is used to estimate frequency-domain particle velocity data. In an embodiment, the Wiener filter $F_v(\omega)$ of equation (8) is applied to the frequency-domain acceleration data such as described in step 1006 above.

In step 1308, frequency-domain acceleration data is calculated based on the frequency-domain particle velocity data. To calculate the acceleration data, this step may include performing a first derivative operation with respect to the frequency-domain particle velocity data. For example, the first derivative filter of equation (4), $i\omega$, may be applied to the frequency-domain particle velocity data.

In step 1310, the energy between of the observed and calculated particle acceleration is estimated and compared to a supplied minimum threshold value. In an embodiment, the energy data may be calculated and compared based on the formulas specified in equations (9), (10), and (11). If $E_{rat}$ is larger than the threshold then the damping factor may be adjusted. If $E_{rat}$ is smaller than the threshold, then the current value of the damping factor may be saved for subsequent processing.

When the threshold is not satisfied at step 1310, then in step 1312, the value of the damping factor is adjusted to a lower value. The lower value may be manually chosen or automatically selected using any suitable mechanism. Once the lower value is selected, the process repeats with step 1306, and the particle velocity data is recalculated using the Wiener filter and the new damping factor. The process repeats until a satisfactory damping factor is determined.

If the threshold is satisfied at step 1310, then the most recent damping factor may be selected and, at step 1314, time-domain particle velocity data is determined from the frequency-domain particle velocity data that was calculated at step 1306 with the selected damping factor. The time-domain particle velocity data may be calculated in the same manner described in step 1008.

In step 1316, the particle velocity value is output such as described in step 1010.

If particle velocity is the input data rather than particle acceleration data, then the damping value may be calculated based on the difference between observed and calculated particle velocity. For example, the following formulas may be used:

$$EV_{obs} = \frac{1}{Nnyq} \sum_{0}^{\omega nyq} V(\omega); \quad (12)$$

$$EV_{calc} = \frac{1}{Nnyq} \sum_{0}^{\omega nyq} V'^2(\omega); \quad (13)$$

and $$E_{rat} = 20\log_{10}\left(\frac{EV_{obs}}{EV_{calc}}\right); \quad (14)$$

where $\omega nyq$ represents the Nyquist angular frequency, $N_{nyq}$ represents the number of angular frequency samples in the spectrum up to the Nyquist frequency, $\Sigma$ represents a summation operator, $EV_{obs}$ represents the energy of the observed velocity, $EV_{calc}$ represents the energy of the calculated velocity, and $E_{rat}$ represents the residual energy. The residual energy may be compared to a supplied threshold value in decibels. If $E_{rat}$ is larger than the threshold then the damping factor may be adjusted. If $E_{rat}$ is smaller than the threshold, then the current value of the damping factor may be selected and saved for subsequent processing including estimating particle displacement from the observed particle velocity data.

Figure 14:
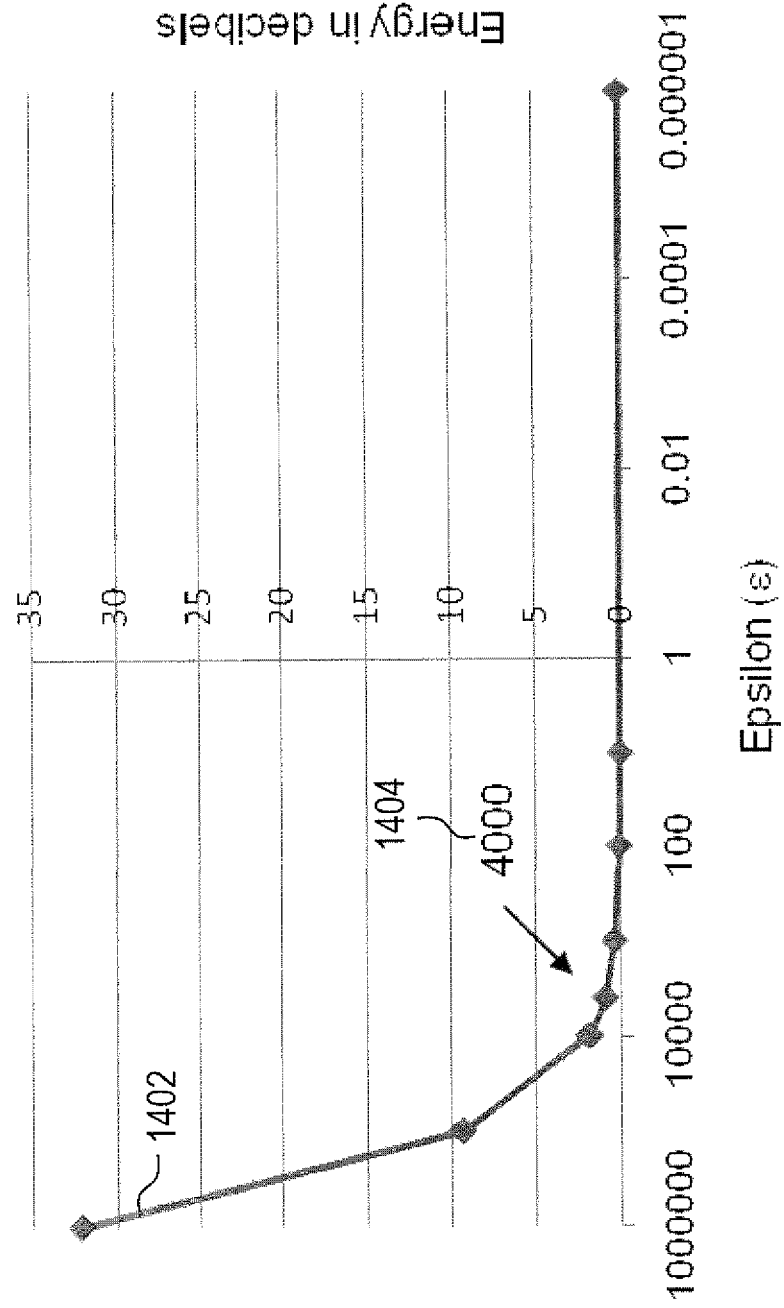
FIG. 14 is a graph showing different scanned damping factors.
Figure 15:
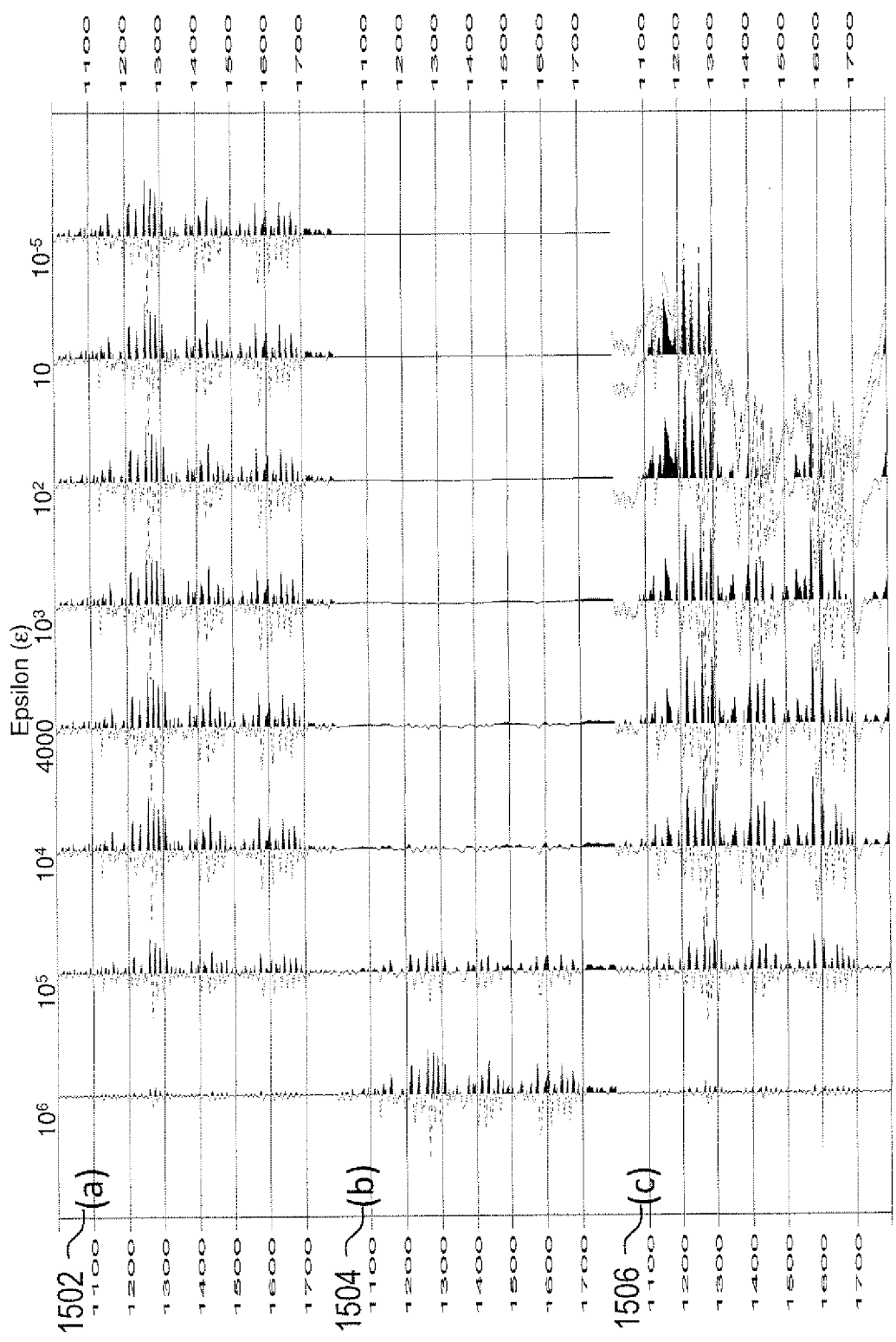
FIG. 15 is a graph illustrating the results of different scanned damping factors when estimating particle velocity.

An example selection of $\epsilon$ is illustrated in FIGS. 14 and 15. FIG. 14 is a graph showing different scanned damping factors. In this case, the scanned damping factors include the following values: $10^6$, $10^5$, $10^4$, 4000, $10^3$, $10^2$, 10 and $10^{-5}$. Plot 1402 illustrates the different values that were tested to determine a satisfactory value. As indicated by the graph point 1404, the value selected in this case was 4000.

FIG. 15 is a graph illustrating the results of different scanned damping factors when estimating particle velocity. Graph (a) 1502 shows acceleration traces that were calculated from the estimated particle velocity traces. As illustrated by this graph, for very large $\epsilon$ values, the energy in the calculated acceleration trace is small, indicating inadequate results. As $\epsilon$ increases in value, the energy in the calculated acceleration trace approaches that of the observed acceleration trace. Graph (b) 1504 shows traces that correspond between the difference in the 'observed' and 'calculated' acceleration data. In this example, the value of 4000 was selected for $\epsilon$ when a threshold of 0.2 decibels was reached. Graph (c) 1506 shows the equivalent calculated particle velocity traces. As $\epsilon$ decreases, the result becomes unstable. This is evident by the presence of very large amplitude and low frequency energy.

If both the particle velocity and the particle displacement are being calculated from the same set of acceleration data, then in one embodiment, the same damping factor may be used for the calculations. The damping factor may be determined using either the process illustrated in FIG. 12 or the process illustrated in FIG. 13. In an alternative embodiment, the damping factor may be independently derived for particle displacement and particle velocity according to the techniques described above. When independently derived, the damping factor may be different for the particle displacement calculation and the particle velocity calculation. Thus, a first damping factor may be selected to calculate particle displacement from the acceleration data and a second damping factor, different than the first, may be selected to calculate particle velocity from the same set of acceleration data.

Satisfactory damping factor(s) may also vary between different sets of acceleration data; therefore, it may be beneficial to determine and select the damping factor(s) on a per data set basis. Accordingly, in one embodiment, the damping factor may be calculated according to the processes illustrated in FIGS. 12 and/or 13 for each distinct set of acceleration data received. In an alternative embodiment, to save on computational resources, damping factor(s) selected for one set of acceleration data may be used for particle displacement and/or particle velocity calculations from other sets of acceleration data. In this case, the damping factors may be periodically updated to minimize the risk of any instability during the integration process.

V. Implementation Examples

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 16:
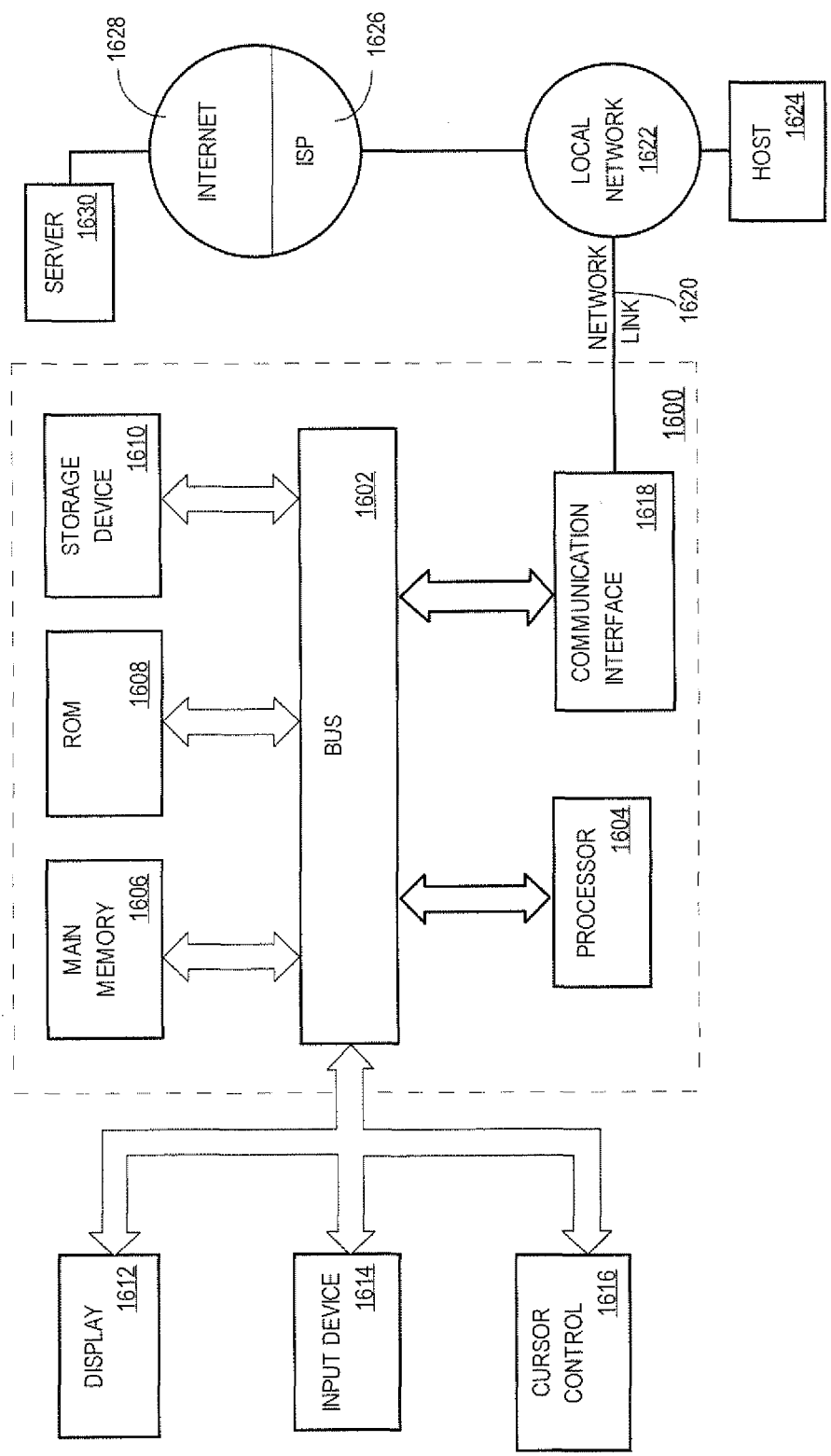
FIG. 16 is a block diagram that illustrates an example computer system upon which an embodiment may be implemented.

For example, FIG. 16 is a block diagram that illustrates an example computer system 1600 upon which an embodiment of the invention may be implemented. Computer system 1600 includes a bus 1602 or other communication mechanism for communicating information, and a hardware processor 1604 coupled with bus 1602 for processing information. Hardware processor 1604 may be, for example, a general purpose microprocessor.

Computer system 1600 also includes a main memory 1606, such as a random access memory (RAM) or other dynamic storage device, coupled to bus 1602 for storing information and instructions to be executed by processor 1604. Main memory 1606 also may be used for storing temporary variables or other intermediate information during execution of instructions to be executed by processor 1604. Such instructions, when stored in non-transitory storage media accessible to processor 1604, render computer system 1600 into a special-purpose machine that is customized to perform the operations specified in the instructions.

Computer system 1600 further includes a read only memory (ROM) 1608 or other static storage device coupled to bus 1602 for storing static information and instructions for processor 1604. A storage device 1610, such as a magnetic disk or optical disk, is provided and coupled to bus 1602 for storing information and instructions.

Computer system 1600 may be coupled via bus 1602 to a display 1612, such as a cathode ray tube (CRT), for displaying information to a computer user. Although bus 1602 is illustrated as a single bus, bus 1602 may comprise one or more buses. For example, bus 1602 may include without limitation a control bus by which processor 1604 controls other devices within computer system 1600, an address bus by which processor 1604 specifies memory locations of instructions for execution, or any other type of bus for transferring data or signals between components of computer system 1600.

An input device 1614, including alphanumeric and other keys, is coupled to bus 1602 for communicating information and command selections to processor 1604. Another type of user input device is cursor control 1616, such as a mouse, a trackball, or cursor direction keys for communicating direction information and command selections to processor 1604 and for controlling cursor movement on display 1612. This input device typically has two degrees of freedom in two axes, a first axis (e.g., x) and a second axis (e.g., y), that allows the device to specify positions in a plane.

Computer system 1600 may implement the techniques described herein using customized hard-wired logic, one or more ASICs or FPGAs, firmware and/or program logic which in combination with the computer system causes or programs computer system 1600 to be a special-purpose machine. According to one embodiment, the techniques herein are performed by computer system 1600 in response to processor 1604 executing one or more sequences of one or more instructions contained in main memory 1606. Such instructions may be read into main memory 1606 from another storage medium, such as storage device 1610. Execution of the sequences of instructions contained in main memory 1606 causes processor 1604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1610. Volatile media includes dynamic memory, such as main memory 1606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1602. Transmission media can also take the form of acoustic or light waves, such as those generated during radio-wave and infra-red data communications.

Various forms of media may be involved in carrying one or more sequences of one or more instructions to processor 1604 for execution. For example, the instructions may initially be carried on a magnetic disk or solid state drive of a remote computer. The remote computer can load the instructions into its dynamic memory and send the instructions over a telephone line using a modem. A modem local to computer system 1600 can receive the data on the telephone line and use an infra-red transmitter to convert the data to an infra-red signal. An infra-red detector can receive the data carried in the infra-red signal and appropriate circuitry can place the data on bus 1602. Bus 1602 carries the data to main memory 1606, from which processor 1604 retrieves and executes the instructions. The instructions received by main memory 1606 may optionally be stored on storage device 1610 either before or after execution by processor 1604.

Computer system 1600 also includes a communication interface 1618 coupled to bus 1602. Communication interface 1618 provides a two-way data communication coupling to a network link 1620 that is connected to a local network 1622. For example, communication interface 1618 may be an integrated services digital network (ISDN) card, cable modem, satellite modem, or a modem to provide a data communication connection to a corresponding type of telephone line. As another example, communication interface 1618 may be a local area network (LAN) card to provide a data communication connection to a compatible LAN. Wireless links may also be implemented. In any such implementation, communication interface 1618 sends and receives electrical, electromagnetic or optical signals that carry digital data streams representing various types of information.

Network link 1620 typically provides data communication through one or more networks to other data devices. For example, network link 1620 may provide a connection through local network 1622 to a host computer 1624 or to data equipment operated by an Internet Service Provider (ISP) 1626. ISP 1626 in turn provides data communication services through the world wide packet data communication network now commonly referred to as the "Internet" 1628. Local network 1622 and Internet 1628 both use electrical, electromagnetic or optical signals that carry digital data streams. The signals through the various networks and the signals on network link 1620 and through communication interface 1618, which carry the digital data to and from computer system 1600, are example forms of transmission media.

Computer system 1600 can send messages and receive data, including program code, through the network(s), network link 1620 and communication interface 1618. In the Internet example, a server 1630 might transmit a requested code for an application program through Internet 1628, ISP 1626, local network 1622 and communication interface 1618.

The received code may be executed by processor 1604 as it is received, and/or stored in storage device 1610, or other non-volatile storage for later execution.

Figure 17:
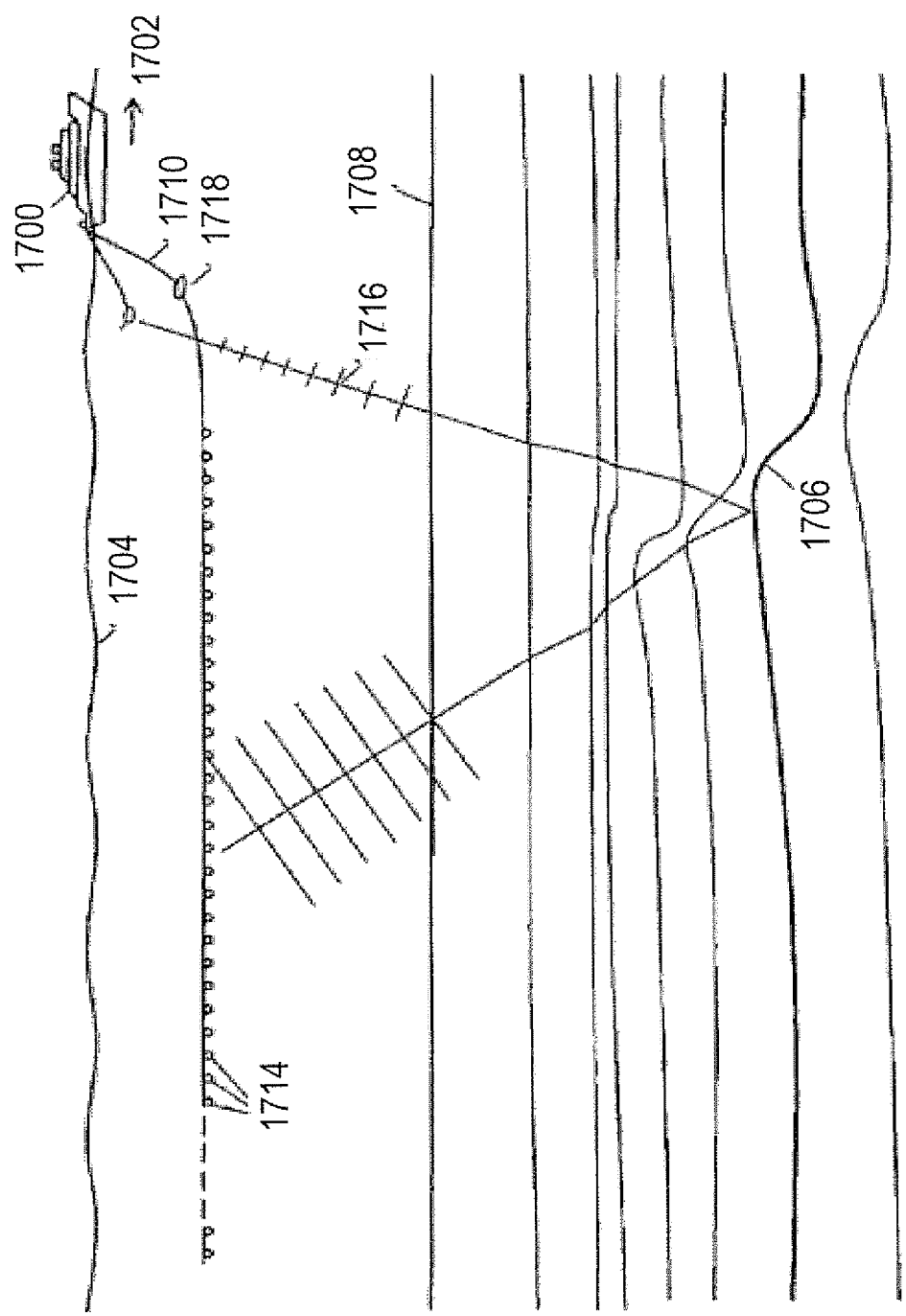
FIG. 17 is an illustration depicting a side view of an example marine seismic survey environment in which an embodiment may be implemented.

Exploration seismology is routinely performed both on land and at sea. At sea, seismic survey ships deploy streamers behind the ship as depicted in FIG. 17, which is an illustration of a side view of an example marine seismic survey environment in which seismic data may be acquired. Each streamer 1710 trails behind ship 1700 as the ship moves forward (in the direction of arrow 1702), and each streamer includes multiple evenly-spaced receivers 1714. Each streamer 1710 may further include one or more diverters 1718 and programmable depth controllers that pull the streamer out to an operating offset distance from the ship's path and down to an operating depth.

Streamers 1710 may be up to several kilometers long, and are usually constructed in sections 25 to 100 meters in length that include groups of up to 35 or more uniformly spaced receivers. Each streamer 1710 includes electrical or fiber-optic cabling for interconnecting receivers 1714 and the seismic equipment on ship 1700. Data may be digitized near receivers 1714 and transmitted to ship 1700 through the cabling at rates of 7 (or more) million bits of data per second.

As depicted in FIG. 17, seismic survey ship 1700 also tows a source 1712. Source 1712 may be an impulse source or a vibratory source. Receivers 1714 may include hydrophones and/or geophones. Source 1712 and receivers 1714 typically deploy below the ocean's surface 1704. Processing equipment aboard the ship controls the operation of the source and receivers and records the acquired data.

Seismic surveys provide data for imaging below the ocean surface 1704 and include subsurface structures such as structure 1706, which lies below the ocean floor 1708. Certain seismic characteristics of recorded seismic data are indicative of oil and/or gas reservoirs.

To image the subsurface structure 1706, source 1712 emits seismic waves 1716 that are reflected where there are changes in acoustic impedance contrast due to subsurface structure 1706 (and other subsurface structures). The reflected waves are detected by a pattern of receivers 1714. By recording, among other things, the elapsed time for the seismic waves 1716 to travel from source 1712 to subsurface structure 1706 to receivers 1714, an image of subsurface structure 1706 can be obtained after appropriate data processing. Data processing may include the techniques for calculating particle acceleration, velocity, and/or displacement data described above.

VI. Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. An apparatus to determine structural information about a geological subsurface, the apparatus comprising:
    an interface configured to receive particle acceleration data;
    one or more processors;
    one or more storage media storing instructions, which, when executed by the one or more processors, cause the apparatus to perform:
        transforming the particle acceleration data from the time domain to the frequency domain;
        in the frequency domain, determining a deterministic Weiner filter having a damping factor based on the particle acceleration data, the damping factor iteratively adjusted to provide stability to the deterministic Weiner filter in the presence of noise in the particle acceleration data;
        applying one of the deterministic Weiner filter to the particle acceleration data to generate particle velocity data and square of the deterministic Wiener filter to the particle acceleration data to generate particle displacement data in the frequency domain; and
        generating an image of the geological subsurface using at least in part the particle velocity data or particle displacement data, the image revealing structural information about the geological subsurface.

2. The apparatus of claim 1, wherein the instructions, when executed, further cause the apparatus to perform: determining the damping factor based on the received particle acceleration data.

3. The apparatus of claim 2, wherein instructions for determining the damping factor comprise instructions for:
    determining, based on the particle velocity or particle displacement data, calculated acceleration data;
    determining whether a threshold is satisfied by comparing the calculated acceleration data with the particle acceleration data; and
    in response to determining that the threshold is not satisfied, adjusting a damping factor.

4. The apparatus of claim 3, wherein instructions for comparing the calculated acceleration data with the particle acceleration data comprise instructions for:
    determining a first energy value from the calculated acceleration data;
    determining a second energy value from the particle acceleration data;
    determining a difference between the first energy value and the second energy value;
    wherein the threshold is satisfied if the difference is less than a threshold difference.

5. The apparatus of claim 1, wherein applying the deterministic Wiener filter with a first damping factor to the particle acceleration data to generate the particle velocity data; and
    applying the square of the deterministic Wiener filter with a second damping factor to the particle acceleration data to generate the particle displacement data,
    the first damping factor is different than the second damping factor.

6. The apparatus of claim 1, wherein the deterministic Weiner filter is $F_v(\omega)=-i\omega/(\omega^2+\epsilon)$ and the square of the deterministic Weiner filter is $F_u(\omega)=[-i\omega/(\omega^2+\epsilon)]^2$, where i represents an imaginary number, $\omega$ represents an angular frequency, and $\epsilon$ represents a damping factor.

7. The apparatus of claim 1, wherein the instructions, when executed, further cause the apparatus to perform: determining a damping factor for each distinct set of acceleration data that is received through the interface.

8. One or more non-transitory storage media storing instructions to determine structural information about a geological subsurface which, when executed by one or more computing devices, cause:

transforming particle acceleration data from the time domain to the frequency domain;

in the frequency domain, determining a deterministic Weiner filter having a damping factor based on the particle acceleration data, the damping factor iteratively adjusted to provide stability to the deterministic Weiner filter in the presence of noise in the particle acceleration data;

applying one of the deterministic Weiner filter to the particle acceleration data to generate one of particle velocity data and square of the deterministic Wiener filter to the particle acceleration data to generate particle displacement data in the frequency domain; and generating an image of the geological subsurface using at least in part the particle velocity data or particle displacement data, the image revealing structural information about the geological subsurface.

9. The one or more non-transitory storage media of claim 8, wherein the instructions, when executed, further cause: determining the damping factor based on the received particle acceleration data.

10. The one or more non-transitory storage media of claim 9, wherein instructions for determining the damping factor comprise instructions for:

determtining, based on the particle velocity or particle displacement data, calculated acceleration data;

determining whether a threshold is satisfied by comparing the calculated acceleration data with the particle acceleration data; and in response to determining that the threshold is not satisfied, adjusting a damping factor.

11. The one or more non-transitory storage media of claim 10, wherein instructions for comparing the calculated acceleration data with the particle acceleration data comprise instructions for:

determining a first energy value from the calculated acceleration data;

determining a second energy value from the particle acceleration data;

determining a difference between the first energy value and the second energy value;

wherein the threshold is satisfied if the difference is less than a threshold difference.

12. The one or more non-transitory storage media of claim 8, wherein applying the deterministic Wiener filter to the particle acceleration data further comprises applying the deterministic Wiener filter with a first damping factor to the particle acceleration data to generate the particle velocity; and applying the square of the deterministic Wiener filter with a second damping factor to the particle acceleration data to generate the particle displacement data comprises processing the particle acceleration data using the filter and a second damping factor;

wherein the first damping factor is different than the second damping factor.

13. The one or more non-transitory storage media of claim 8, wherein the deterministic Weiner filter is $F_v(\omega) = -i\omega/(\omega^2 + \epsilon)$ and the square of the deterministic Weiner filter is $F_u(\omega) = [-i\omega/(\omega^2 + \epsilon)]^2$, where i represents an imaginary number, $\omega$ represents an angular frequency, and $\epsilon$ represents a damping factor.

14. The one or more non-transitory storage media of claim 8, wherein the instructions, when executed, further cause: characterizing subterranean geological features based on the particle velocity data or the particle displacement data.

15. A method to determine structural information about a geological subsurface, the method comprising:

transforming particle acceleration data from the time domain to the frequency domain;

in the frequency domain, determining a deterministic Weiner filter having a damping factor based on the particle acceleration data, the damping factor iteratively adjusted to provide stability to the deterministic Weiner filter in the presence of noise in the particle acceleration data;

applying one of the deterministic Weiner filter to the particle acceleration data to generate particle velocity data and square of the deterministic Wiener filter to the particle acceleration data to generate particle displacement data in the frequency domain; and generating an image of the geological subsurface using at least in part the particle velocity data or particle displacement data, the image revealing structural information about the geological subsurface.

16. The method of claim 15, further comprising determining the damping factor based on the received particle acceleration data.

17. The method of claim 16, wherein determining the damping factor comprises:

determining, based on the particle velocity or particle displacement data, calculated acceleration data;

determining whether a threshold is satisfied by comparing the calculated acceleration data with the particle acceleration data; and in response to determining that the threshold is not satisfied, adjusting a damping factor.

18. The method of claim 17, wherein comparing the calculated acceleration data with the particle acceleration data comprises:

determining a first energy value from the calculated acceleration data;

determining a second energy value from the particle acceleration data;

determining a difference between the first energy value and the second energy value;

wherein the threshold is satisfied if the difference is less than a threshold difference.

19. The method of claim 15, further comprising:

applying the deterministic Wiener filter with a first damping factor to the particle acceleration data to generate the particle velocity data; and applying the square of the deterministic Wiener filter with a second damping factor to the particle acceleration data to generate the particle displacement data, the first damping factor is different than the second damping factor.

20. The method of claim 15, wherein the deterministic Weiner filter is $F_v(\omega) = -i\omega/(\omega^2 + \epsilon)$ and the square of the deterministic Weiner filter is $F_u(\omega) = [-i\omega/(\omega^2 + \epsilon)]^2$, where i represents an imaginary number, $\omega$ represents an angular frequency, and $\epsilon$ represents a damping factor.

21. A method to determine structural information about a geological subsurface, the method comprising:

determining a deterministic Weiner filter including one or more damping factors based on particle acceleration data;

applying the deterministic Weiner filter to the particle acceleration data in the frequency domain to determine one or more of particle velocity data or particle displacement data;

in response to determining that stability of the particle velocity data or the particle displacement data does not satisfy a threshold, adjusting one or more of the one or more damping factors of the filter; and generating an image of the geological subsurface using at least in part the particle velocity data or particle displacement data the image revealing structural information about the geological subsurface, wherein the method is performed by one or more computing devices.

22. The method of claim 21, further comprising repeating said steps of applying and adjusting until the stability of the particle velocity data or the particle displacement data satisfies the threshold.

23. The method of claim 21, wherein determining that the particle displacement data does not satisfy a threshold comprises:

after applying the deterministic Weiner filter including one or more damping factors to the particle acceleration data to determine one or more of particle velocity data or particle displacement data:

calculating second particle acceleration data from the particle velocity data or particle displacement data;

determining that a difference between a first energy value of the particle acceleration data and a second energy value of the second particle acceleration data does not satisfy a threshold.

24. The method of claim 23 wherein the difference between the first energy value and the second energy value does not satisfy a threshold when greater than a threshold value.

25. The method of claim 21, wherein the deterministic Weiner filter at least approximates a Wiener filter.

26. The method of claim 21 further comprising measuring the particle acceleration data using one or more seismic sensors.

* * * * *